(12) United States Patent
Jang et al.

(10) Patent No.: US 12,213,123 B2
(45) Date of Patent: Jan. 28, 2025

(54) METHOD AND DEVICE FOR CONTROLLING BEAM IN WIRELESS COMMUNICATION SYSTEM

(71) Applicant: SAMSUNG ELECTRONICS CO., LTD., Suwon-si (KR)

(72) Inventors: Jaehyuk Jang, Suwon-si (KR); Soenghun Kim, Suwon-si (KR); Sangbum Kim, Suwon-si (KR); Seungri Jin, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/809,207

(22) Filed: Jun. 27, 2022

(65) Prior Publication Data

US 2023/0015036 A1 Jan. 19, 2023

Related U.S. Application Data

(63) Continuation of application No. 16/960,868, filed as application No. PCT/KR2019/000336 on Jan. 9, 2019, now Pat. No. 11,375,508.

(51) Int. Cl.
*H04W 24/08* (2009.01)
*H04W 72/044* (2023.01)
*H04W 76/28* (2018.01)

(52) U.S. Cl.
CPC ......... *H04W 72/046* (2013.01); *H04W 24/08* (2013.01); *H04W 76/28* (2018.02)

(58) Field of Classification Search
CPC ... H04W 72/046; H04W 24/08; H04W 76/28; H04W 72/54; H04W 72/04; H04W 72/542; H04W 72/23; H04W 16/28; H04B 7/0695; H04B 7/088
See application file for complete search history.

(56) References Cited

U.S. PATENT DOCUMENTS

| 10,952,277 B2 | 3/2021 | Yang |
| 10,993,183 B2 | 4/2021 | Islam et al. |
| 2015/0078189 A1 | 3/2015 | Kwon et al. |

(Continued)

FOREIGN PATENT DOCUMENTS

| KR | 10-2018-0015589 A | 2/2018 |
| WO | 2018/026188 A1 | 2/2018 |

OTHER PUBLICATIONS

InterDigital, Inc., "Remaining issues on beam management", 3GPP TSG RAN WG1 Meeting #91, Nov. 27-Dec. 1, 2017, R1-1720630, 13 pages.
Huawei, HiSilicon, "Consideration on DRX with beam management", 3GPP TSG-RAN WG2#100, Nov. 27-Dec. 1, 2017, R2-1712562, 5 pages.
Qualcomm Incorporated, "Beam management in C-DRX", 3GPP TSG-RAN WG2 Meeting #100, Nov. 27-Dec. 1, 2017, R2-1713892, 3 pages.

(Continued)

*Primary Examiner* — Jae Y Lee
*Assistant Examiner* — Hector Reyes

(57) ABSTRACT

The present disclosure relates to: a communication method for converging an IoT technology with a 5G communication system for supporting a higher data transfer rate beyond the 4G system; and a system therefor. The present disclosure can be applied to intelligent services (for example, smart homes, smart buildings, smart cities, smart cars or connected cars, healthcare, digital education, retail business, security and safety services, etc.) on the basis of 5G communication technologies and IoT-related technologies.

14 Claims, 20 Drawing Sheets

(56) References Cited

U.S. PATENT DOCUMENTS

| | | | |
|---|---|---|---|
| 2015/0245378 A1* | 8/2015 | Kim | H04W 74/006 |
| | | | 370/329 |
| 2017/0302355 A1 | 10/2017 | Islam et al. | |
| 2018/0103369 A1* | 4/2018 | Chou | H04W 8/24 |
| 2018/0255607 A1 | 9/2018 | Nagaraja et al. | |
| 2018/0270700 A1* | 9/2018 | Babaei | H04W 28/0278 |
| 2018/0270868 A1* | 9/2018 | Ou | H04W 74/004 |
| 2018/0288810 A1* | 10/2018 | Ishii | H04W 72/23 |
| 2018/0302841 A1* | 10/2018 | Fan | H04W 48/08 |
| 2019/0037495 A1 | 1/2019 | John Wilson et al. | |
| 2019/0059129 A1 | 2/2019 | Luo et al. | |
| 2019/0149308 A1* | 5/2019 | Son | H04L 5/0007 |
| | | | 375/260 |
| 2020/0084782 A1* | 3/2020 | Rune | H04W 48/12 |
| 2021/0195521 A1 | 6/2021 | Muller et al. | |

OTHER PUBLICATIONS

International Search Report dated Apr. 5, 2019 in connection with International Patent Application No. PCT/KR2019/000336, 2 pages.
Written Opinion of the International Searching Authority dated Apr. 5, 2019 in connection with International Patent Application No. PCT/KR2019/000336, 5 pages.
European Patent Office, "Communication pursuant to Article 94(3) EPC," dated Oct. 24, 2022, in connection with European Patent Application No. 19739134.5, 13 pages.
Korean Intellectual Property Office, "Notification of the Reasons for Rejection," dated Oct. 27, 2022, in connection with Korean Patent Application No. 10-2018-0003594, 7 pages.
Communication pursuant to Article 94(3) EPC dated Aug. 30, 2024, in connection with European Patent Application No. 19739134.5, 9 pages.

* cited by examiner (a) Single beam in LF    (b) multiple beams in HF (a) DRX cycle (b) Example 1 of Beam management timing configuration (BMTC)

(c) Example 2 of Beam management timing configuration (d) Triggering drx-InactivityTimer during DRX operation (e) Skipping Beam management timing configuration

METHOD AND DEVICE FOR CONTROLLING BEAM IN WIRELESS COMMUNICATION SYSTEM

CROSS-REFERENCE TO RELATED APPLICATIONS

This application is a continuation of application Ser. No. 16/960,868, now U.S. Pat. No. 11,375,508 issued Jun. 28, 2022, which is a 371 of PCT International Application No. PCT/KR2019/000336 filed on Jan. 9, 2019, which claims priority to Korean Patent Application No. 10-2018-0003594, filed Jan. 10, 2018 in the Korean Intellectual Property Office, the disclosures of which are herein incorporated by reference in their entirety.

BACKGROUND

1. Field

The present disclosure relates to a method to control a beam by a terminal or a base station in a wireless communication system.

2. Description of Related Art

To meet the demand for wireless data traffic, which has increased since deployment of 4th-generation (4G) communication systems, efforts have been made to develop an improved 5th-generation (5G) or pre-5G communication system. Therefore, the 5G or pre-5G communication system is also called a 'Beyond 4G Network' or a 'Post LTE system'.

It is considered that the 5G communication system will be implemented in millimeter wave (mmWave) bands, e.g., 60 GHz bands, so as to accomplish higher data rates. To reduce propagation loss of radio waves and increase a transmission distance, a beam forming technique, a massive multiple-input multiple-output (MIMO) technique, a full dimensional MIMO (FD-MIMO) technique, an array antenna technique, an analog beam forming technique, and a large scale antenna technique are discussed in 5G communication systems.

In addition, in 5G communication systems, development for system network improvement is under way based on advanced small cells, cloud radio access networks (RANs), ultra-dense networks, a Device to Device communication (D2D), a wireless backhaul, a moving network, a cooperative communication, coordinated multi-points (CoMP), reception-end interference cancellation, and the like.

In the 5G system, a hybrid FSK and QAM modulation (FQAM) and a sliding window superposition coding (SWSC) as an advanced coding modulation (ACM) scheme, and a filter bank multi carrier (FBMC) scheme, a non-orthogonal multiple access (NOMA) scheme, and a sparse code multiple access (SCMA) scheme as an advanced access technology have been developed.

The internet, which is a human centered connectivity network where humans generate and consume information, is now evolving to the internet of things (IoT) where distributed entities, such as things, exchange and process information without human intervention. The internet of everything (IoE), which is a combination of the IoT technology and the big data processing technology through connection with a cloud server, has emerged.

As technology elements, such as "sensing technology", "wired/wireless communication and network infrastructure", "service interface technology", and "security technology" have been demanded for IoT implementation, sensor networks, machine to machine (M2M) communication, machine type communication (MTC), and so forth have been recently researched.

Such an IoT environment may provide intelligent internet technology (IT) services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing IT and various industrial applications.

Accordingly, various attempts have been made to apply a 5G communication system to an IoT network. For example, a technology such as a sensor network, a machine to machine communication, MTC, and/or the like has been implemented with a 5G communication technology such as beamforming, MIMO, an array antenna, and/or the like. A case that a cloud radio access network as described above is applied as big data processing technology may be an example of convergence of a 5G technology and an IoT technology.

This disclosure proposes a method and apparatus to control a discontinuous reception mode (discontinuous reception (DRX)) in a wireless communication system as a method related to a beam control operation by a terminal and a base station in a next-generation mobile communication system.

Further, the present disclosure proposes a radio link control (RLC) operation method and apparatus thereof when packet duplication is deactivated in a wireless communication system as content related to packet-duplicated data transmission which is newly introduced in a next-generation mobile communication system. Specifically, a terminal operation is clearly defined in a case that the terminal receives activation or deactivation for packet duplication from a base station through a media access control element (MAC CE). In particular, the present disclosure proposes a detailed operation in a secondary RLC entity when the deactivation for the packet duplication is received.

In addition, a method and apparatus to allocate a preamble group for requesting system information in a wireless communication system as a method in which a terminal requests system information which a base station broadcasts to the terminal within a cell by transmitting a random access preamble in a case that the cell communicates using a plurality of beams in the wireless communication system.

SUMMARY

The present disclosure proposes a method to control a beam by a terminal, and the method may include receiving beam management timing configuration (BMTC) from a base station; and monitoring downlink information based on information required for a beam management operation included in the BMTC.

The present disclosure may further include identifying whether to change to a second serving beam based on quality information which is derived from a signal received from a first serving beam.

The present disclosure may further include receiving, from the base station, information indicating a change in cycle information included in the BMTC.

In the present disclosure, the information required for the beam management operation may include at least one of cycle information, a start time point of the BMTC, a beam management operation duration (onduration), or threshold information related to a change in a serving beam.

The present disclosure proposes a method to control a discontinuous reception mode, thereby minimizing overhead which may occur due to a beam control operation.

The present disclosure defines a method to transmit packet-duplicated data which is newly introduced in a next-generation mobile communication system, in particular, an operation of a terminal in a case of receiving a packet duplication deactivation MAC CE, thereby clarifying an operation of the terminal and a base station through packet duplication. In detail, in a case that packet duplication deactivation for a corresponding DRB is indicated to the terminal through a MAC CE, the present disclosure may specify how a data packet which is remained without being delivered to a transmission buffer and a retransmission buffer of a corresponding RLC is processed, and provide a related RLC operation.

In the present disclosure, a terminal may request system information in a specific beam in a wireless communication system.

DETAILED DESCRIPTION

Hereinafter, the operating principle of the present disclosure will be described in detail with reference to the accompanying drawings. In the following description of the present disclosure, a detailed description of known configurations or functions incorporated herein will be omitted when it is determined that the detailed description may make the subject matter of the present disclosure unclear. The terms as described below are defined in consideration of the functions in the embodiments, and the meaning of the terms may vary according to the intention of a user or operator, convention, or the like. Therefore, the definitions of the terms should be made based on the contents throughout the specification.

In the following description, terms for identifying an access node, terms referring to network entities, terms referring to messages, terms referring to interfaces between network entities, and terms referring to various pieces of identification information are used for convenience of description. Accordingly, the disclosure is not limited to the following terms and other terms having the same technical meaning may be used.

For convenience of description, the disclosure uses terms and names defined in a 3rd-generation partnership project, long-term evolution (3GPP LTE) standard or terms and names changed on the basis thereof. However, the disclosure may not be limited by the terms and names, and may be equally applied to a system that is based on another standard.

Figure 1:
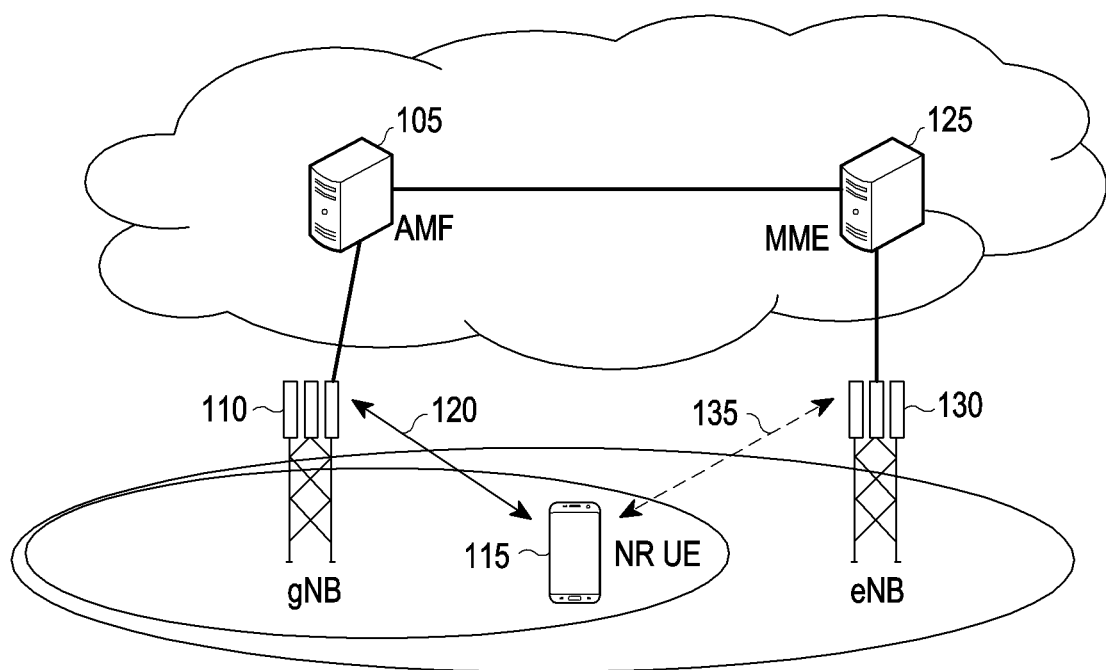
FIG. 1 is a diagram illustrating a structure of a next-generation mobile communication system according to an embodiment.

FIG. 1 is a diagram illustrating a structure of a next-generation mobile communication system according to an embodiment.

Referring to FIG. 1, as shown in FIG. 1, a radio access network of a next-generation mobile communication system (referred to as "new radio", "NR", "5G", "5G NR", "NR system", "5G system", and "5G NR system") may include a next-generation base station (a new radio node B, hereinafter, referred to a gNB) 110 and an access and mobility function (AMF) (hereinafter, referred to as "new radio core network", and "NR CN") 105. A user terminal (a new radio user equipment, hereinafter, referred to an NR UE, or a terminal) 115 may access an external network through the gNB 110 and the AMF 105.

In FIG. 1, the gNB may correspond to an evolved node B (eNB) of an existing LTE system. The gNB 110 may be connected to the NR UE 115 through a radio channel and may provide a better service than an existing node B (120).

In the next-generation mobile communication system, all user traffic is served through a shared channel, so a device for collecting state information such as buffer states, available transmission power states, channel states, and/or the like of UEs and scheduling the UEs is needed, and the gNB 110 may be in charge of this. One gNB 110 may generally control a plurality of cells. The gNB 110 may have a bandwidth wider than or equal to an existing maximum bandwidth in order to implement ultra-high speed data transmission compared to existing LTE, and use an orthogonal frequency division multiplexing (OFDM) scheme as a radio access technology, thereby a beamforming technology may be grafted. Further, an adaptive modulation & coding (AMC) scheme which determines a modulation scheme and a channel coding rate corresponding to a channel state of a terminal may be applied.

The AMF 105 may perform a function of supporting mobility, establishing a bearer, and setting quality of service (QoS), and/or the like. The AMF 105 is a device which is in charge of various control functions as well as a mobility management function for the terminal, and may be connected to a plurality of base stations. Further, the next-generation mobile communication system may interwork with the existing LTE system, and the AMF 105 may be connected to an MME 125 through a network interface. The MME 125 may be connected to the eNB 130, which is an existing base station.

A terminal supporting dual connectivity between an LTE system and an NR system (LTE-NT dual connectivity) may transmit and receive data while maintaining a connection not only to the gNB 110 but also to the eNB 130 (135).

Figure 2:
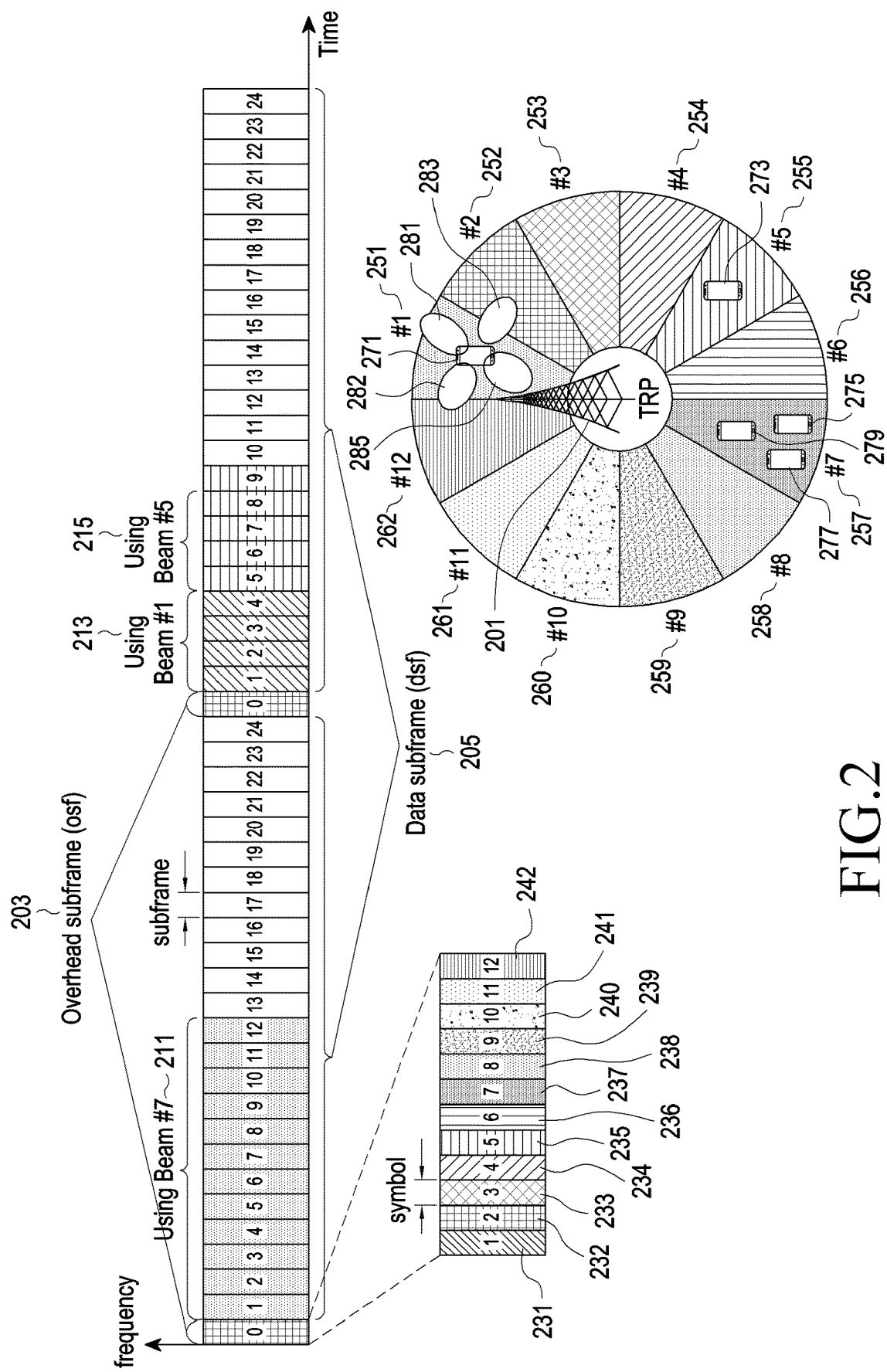
FIG. 2 is a diagram for describing a frame structure used in an NR system according to an embodiment.

FIG. 2 is a diagram for describing a frame structure used in an NR system according to an embodiment.

The NR system may consider a scenario of operating at a high frequency to secure a wide frequency bandwidth for a high transmission rate, and a scenario of generating a beam to transmit data due to difficulty in signal transmission at a high frequency.

Accordingly, a scenario in which a base station or a Transmission Reception Point (TRP) 201 communicates with terminals 271, 273, 275, 277, and 279 within a cell using different beams may be considered. That is, in this exemplary drawing, a scenario in which a terminal 1 271 communicates using a beam #1 251, a terminal 2 273 communicates using a beam #5 255, and a terminal 3 274, a terminal 4 277, and a terminal 5 279 communicates using a beam #7 257 will be assumed.

An overhead subframe (osf) 203 exists in time for measuring that a terminal communicates with the TRP 201 using which beam, and a base station may transmit a reference signal using a different beam per symbol (or across multiple symbols) in the osf. A beam index value for identifying each beam may be derived from the reference signal.

In FIG. 2, it will be assumed that there are 12 beams from a beam #1 251 to a beam #12 262 which the base station transmits, and different beams are sweeping and are transmitted in each symbol in the osf 203. That is, each beam is transmitted in each symbol within the osf 203 (for example, the beam #1 251 is transmitted in a first symbol 231), and the terminal measures the osf 203, thereby measuring which signal transmitted from which beam is the strongest among beams transmitted within the osf 203.

In FIG. 2, a scenario in which the corresponding osf 203 is repeated every 25 subframes will be assumed, and the remaining 24 subframes are data subframes (dsf) 205 in which normal data is transmitted and received.

Accordingly, a scenario in which terminal 3 274, terminal 4 277, and terminal 5 279 communicate commonly using beam #7 257 (211), terminal 1 271 communicates using beam #1 251 (213), and terminal 2 273 communicates using beam #5 255 (215), according to scheduling of the base station, will be assumed.

In FIG. 2, transmission beam #1 251 to transmission beam #12 262 of the base station are mainly illustrated, but a reception beam of the terminal for receiving the transmission beam of the base station (for example, of 281, 283, 285, and 287 of terminal 1 271) may be further considered. In this example diagram, terminal 1 271 may have four reception beams 281, 283, 285, and 287, and perform beam sweeping for identifying which beam has the best reception performance. At this time, in a case that a plurality of beams may not be used at the same time, an optimal transmission beam of the base station and an optimal reception beam of the terminal may be searched by receiving osfs 203 as many as the number of reception beams using one reception beam for each osf 203.

Figure 3:
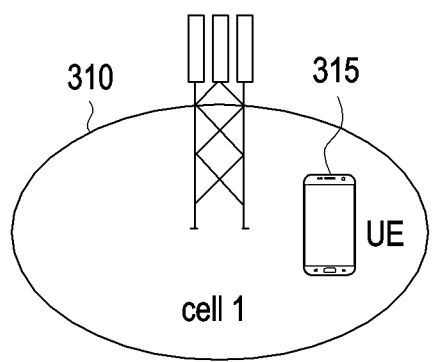
FIG. 3 is a diagram for describing beam-based data transmission in a cell which uses a high frequency band according to an embodiment.
Figure 3:
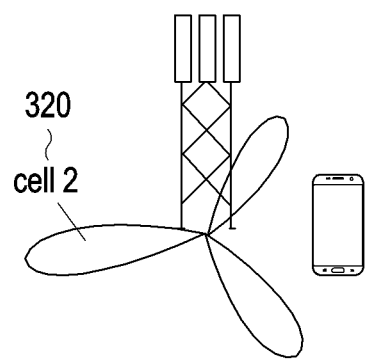

FIG. 3 is a diagram for describing beam-based data transmission in a cell which uses a high frequency band according to an embodiment.

In a next-generation mobile communication system, it may be applied to all of a low frequency band and a high frequency band. Generally, a cell 310 having a low frequency which is lower than or equal to 6 GHz may form a service area using an omni-directional antenna or a sector antenna. On the other hand, a radio path loss rate of a cell 320 having a high frequency which is higher than or equal to 6 GHz is high, so a beam antenna which concentrates an antenna gain on a very narrow angle is applied to ensure a service area.

Figure 4:
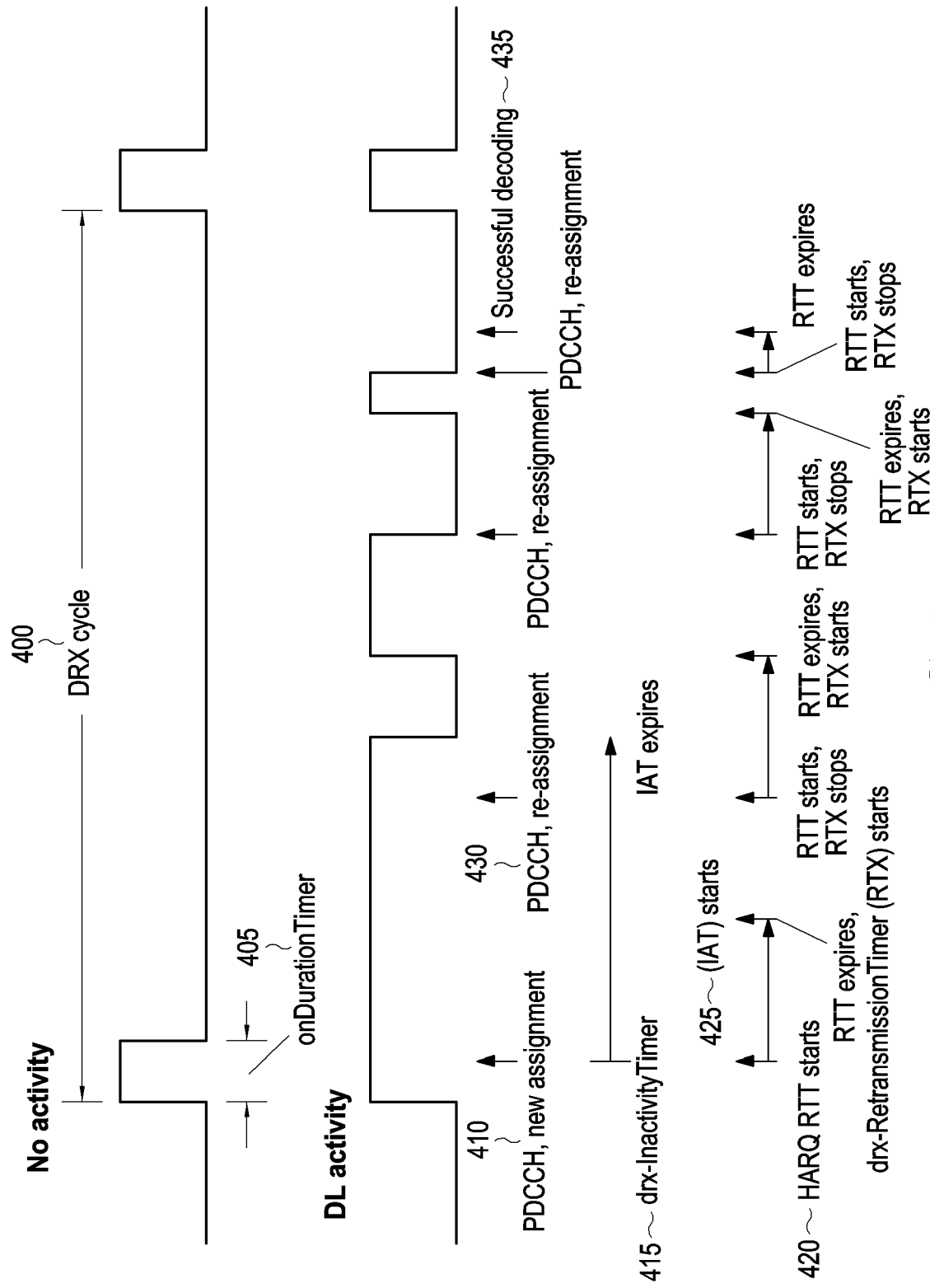
FIG. 4 is a diagram for describing a discontinuous reception (DRX) operation according to an embodiment.

FIG. 4 is a diagram for describing a discontinuous reception (DRX) operation according to an embodiment.

A discontinuous reception mode (discontinuous reception (DRX), hereinafter referred to as "DRX") is applied to minimize power consumption of a terminal, and the DRX is a technology of monitoring only in a predetermined physical downlink control channel (PDCCH) to obtain scheduling information.

The DRX may be operated in both of an idle mode and a connected mode, however an operation method thereof is slightly different. This disclosure relates to the connected mode. A case that the terminal continuously monitors the PDCCH in order to obtain the scheduling information will cause large power consumption. A basic DRX operation may have a DRX cycle 400, and monitor a PDCCH only during a beam management operation duration (on-duration) 405 time. In a connected mode, two values of a DRX cycle, long DRX and short DRX may be set. In a general case, a long DRX cycle is applied, and if necessary, a base station may trigger a short DRX cycle using a MAC Control Element (CE). After predetermined time elapses, the terminal may change from the short DRX cycle to the long DRX cycle. Initial scheduling information of a specific terminal may be provided only in the predetermined PDCCH. Therefore, the terminal may minimize power consumption by periodically monitoring only the PDCCH. If scheduling information for a new packet is received via the PDCCH during the on-duration (405) time (410), the terminal may start a DRX inactivity timer (415). The terminal may maintain an active state during the DRX inactivity timer. That is, the terminal may continue PDCCH monitoring. In addition, the terminal may also start a Hybrid Automatic Repeat and request round trip time (HARQ RTT) timer 420. An HARQ RTT timer is applied to prevent the terminal from monitoring the PDCCH unnecessarily during HARQ round trip time (RTT) time, and the terminal does not need to perform the PDCCH monitoring during running time of the timer. However, while the DRX inactivity timer and the HARQ RTT timer run simultaneously, the terminal may continue the PDCCH monitoring based on the DRX inactivity timer. If the HARQ RTT timer expires, a DRX retransmission timer 425 may be started. While the DRX retransmission timer runs, the terminal needs to perform the PDCCH monitoring. Generally, during running time of a DRX retransmission timer, scheduling information for HARQ retransmission may be received (430). Upon receiving the scheduling information, the terminal may immediately stop the DRX retransmission timer and start the HARQ RTT timer again. The above operation may be continued until the packet is successfully received (435).

Configuration information related to the DRX operation in the connection mode may be transmitted to the terminal through a radio resource control (RRC) connection reconfiguration (RRCConnectionReconfiguration) message. The beam management operation duration timer (on-duration timer), the DRX inactivity timer, and the DRX retransmission timer may be defined by the number of PDCCH subframes. After a timer starts, if the number of subframes defined as a PDCCH subframe elapses, the timer may expire. In a frequency division duplex (FDD), all downlink subframes belong to a PDCCH subframe, and in a time division duplex (TDD), a downlink subframe and a special subframe may correspond to this. In the TDD, a downlink subframe, an uplink subframe, and a special subframe may exist in the same frequency band. Among them, the downlink subframe and the special subframe may be considered as the PDCCH subframe.

The base station may set two states, long DRX and short DRX. Generally, the base station will use one of the two states in consideration of power preference indication information reported from the terminal, terminal mobility record information, and a characteristic of an established data radio bearer (DRB). Transition for the two states is made by transmitting whether a specific timer expires or a specific MAC CE to the terminal.

Only two DRX cycles may be set in an existing LTE technology, a DRX cycle may not be dynamically changed according to various DRB characteristics, traffic patterns, buffer states, and/or the like.

The present disclosure proposes a method for minimizing overhead due to a beam management operation performed before PDCCH monitoring and effectively performing the beam management operation in a next-generation mobile communication system. To this end, if a specific condition is satisfied, the overhead due to the beam management operation is reduced by omitting entirely or partially the beam management operation. Further, a detailed operation of beam management is proposed.

Figure 5:
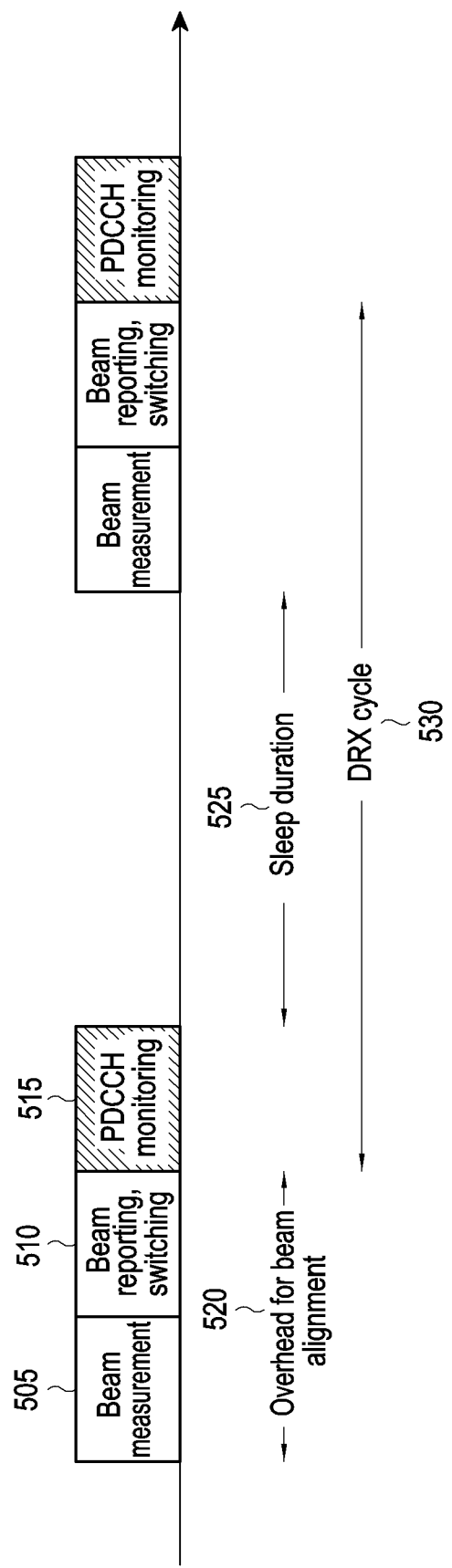
FIG. 5 is a diagram for describing a process of performing beam management (beam alignment) before PDCCH monitoring according to an embodiment.

FIG. 5 is a diagram for describing a process of performing beam management (beam alignment) before PDCCH monitoring according to an embodiment.

In a high frequency which is higher than or equal to 6 GHz, a beam antenna-based mobile communication system is suitable. However, additional procedures are required to support this beam antenna-based operation. One of them is a beam management operation. Generally, in a low frequency band, a base station may apply an omni-directional antenna or a sector antenna, and a terminal may apply the omni-directional antenna. So, in order to transmit and receive data, there is no need to perform antenna management in advance. However, if at least one of the base station or the terminal applies a beam antenna, a beam management operation of determining which beam antenna will be used for data transmission and reception is required. For example, in the beam antenna-based mobile communication system, when the terminal performs a DRX operation, i.e., periodic PDCCH monitoring 515, a beam management operation 520 is required in advance. Generally, the beam management operation includes a beam measurement procedure 505, and a measurement result reporting, beam switching or beam failure recovery procedure 510. The beam management operation is not required in a system which is not based on a beam antenna, so it may be regarded as a kind of overhead imposed by applying a beam antenna-based system. Therefore, the present disclosure proposes a scheme of minimizing the overhead. In the beam measurement operation, if quality of a current serving beam is higher than a specific first threshold, the terminal may maintain the current serving beam and omit the beam switching procedure. The quality of the serving beam is a reference signal received power (RSRP) value, a reference signal received quality (RSRQ) value or a signal-to-interference-plus-noise ratio (SNIR) value which is obtained by measuring a synchronous signal block (SSB) or a channel state information reference signal (CSI-RS) which corresponds to the beam. If the quality of the serving beam is not higher than a specific threshold, and quality of at least one adjacent candidate beam is higher than a specific second threshold, a random access may be performed in the network for changing the adjacent candidate beam to a new serving beam. The new serving beam may be reported to the network using a specific message during or after the random access process. The adjacent candidate beam is a set of beams which are emitted from the same cell as the current serving beam and satisfy a predetermined condition. For example, the predetermined condition may mean that quality of a beam is higher than a specific third threshold, and a beam satisfying the predetermined condition may be an adjacent candidate beam. If all of the quality of the serving beam or the quality of the adjacent candidate beams are lower than the threshold values, the terminal may perform a beam failure recovery (BFR) operation. The BFR operation is an operation of scanning adjacent beams to search for an optimal beam. The first, second, and third thresholds may be provided from the network, or predefined values may be used as the first, second, and third thresholds. Alternatively, dedicated signaling may be used when the first, second, and third thresholds are provided from the network. Start of the beam management operation may be determined explicitly or implicitly. In the present disclosure, the beam management operation is set, and the configuration information (beam management timing configuration (BMTC)) may include cycle information. The network may explicitly provide a start time point and an operation duration of the beam management operation through the configuration information (beam management timing configuration (BMTC)). Alternatively, the start time point may be determined from an SSB (of the serving beam) closest to a start time point of onduration. Alternatively, the operation duration may be determined to include all of an SSB of the serving beam and an SSB of the adjacent candidate beam. The start point and the operation duration may be determined according to terminal implementation.

Figure 6:
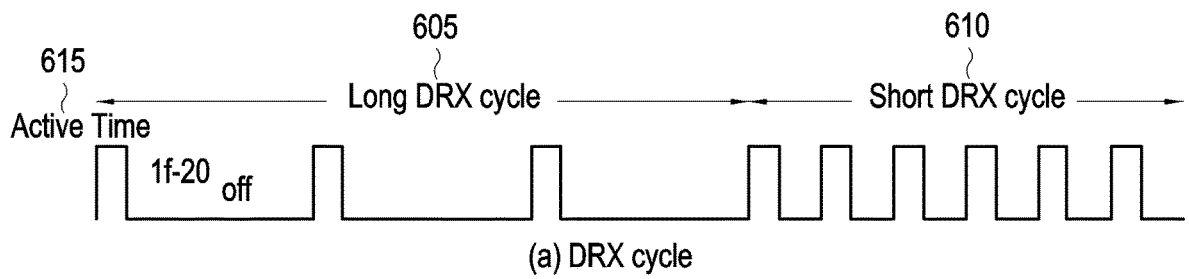
FIG. 6 is a diagram for describing a terminal operation for beam management before active time according to an embodiment.
Figure 6:
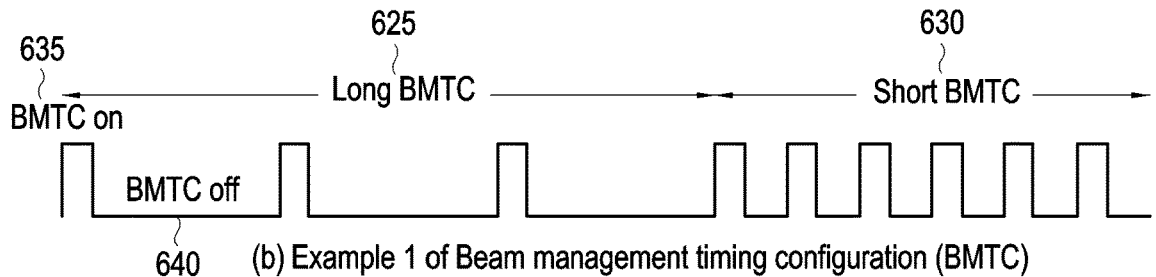
Figure 6:
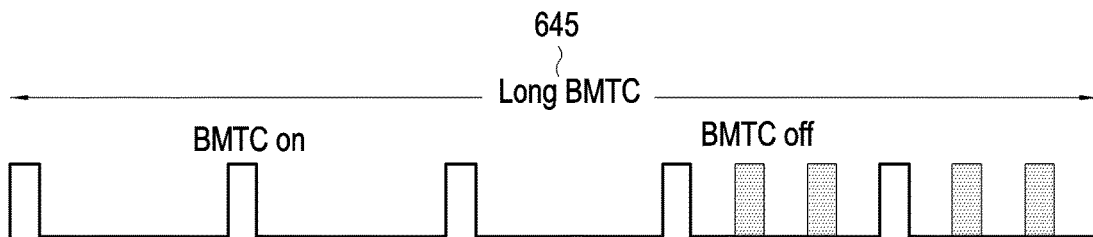
Figure 6:
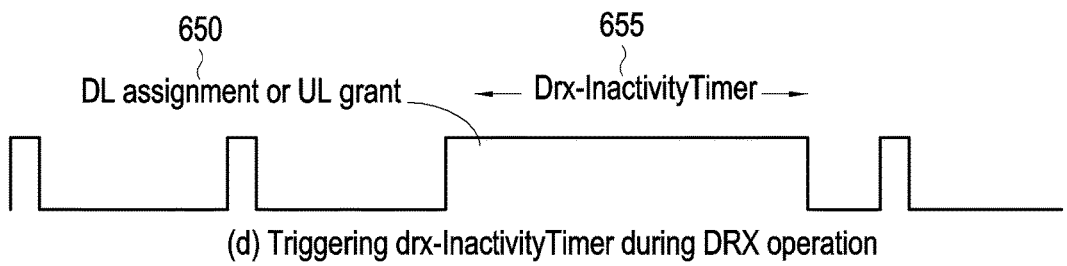
Figure 6:
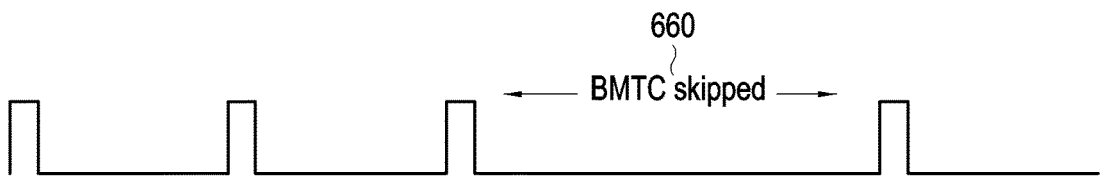

FIG. 6 is a diagram for describing a terminal operation for beam management before active time according to an embodiment.

As described above, in a connected mode, a terminal may perform a DRX operation according to setting of a network in order to save power consumption. In the DRX operation, two types of DRX cycles may be provided, which are a long DRX cycle and a short DRX cycle, respectively. A time duration called active time is activated every DRX cycle, the terminal may monitor information transmitted by the network in a downlink during this time duration. Generally, the terminal may monitor a PDCCH channel to identify whether scheduling information of the terminal is provided.

Generally, a beam management operation may be required before the active time. The configuration information (beam management timing configuration (BMTC)) may also include cycle information. The cycle may be provided in two types, a long BMTC cycle and a short BMTC cycle. The cycle has a multiple of a set DRX cycle. This is to prevent the beam management operation from being performed in an unnecessary time duration before the active time. For example, the long BMTC cycle may be determined as a multiple of the long DRX cycle, and the short BMTC cycle may be determined as a multiple of the short DRX cycle. The two types of BMTC cycles can be changed by a specific MAC CE. Briefly, the BMTC cycles may be matched with DRX cycles and may be changed with a change in a DRX cycle. However, if a terminal moving speed is not high, the serving beam will not be changed frequently. So, even if the short DRX cycle is activated, the long BMTC cycle may be used.

If a beam is already managed before a beam management duration (BM duration) is started (if an optimal serving beam is being tracked), there is no need to perform a beam management operation separately. For example, if scheduling information such as DL assignment or UL grant, etc., is received during an on-duration duration, the terminal may run a drx-InactivityTimer and maintain active time at least until the timer expires. So, a separate beam management operation is not required while the drx-InactivityTimer is run. So, if the condition is satisfied, the beam management operation may be omitted. If the drx-InactivityTimer expires, the beam management operation may be performed before active time generated by an HARQ RTT timer and a drx-retransmissionTimer, or onduration.

Figure 7:
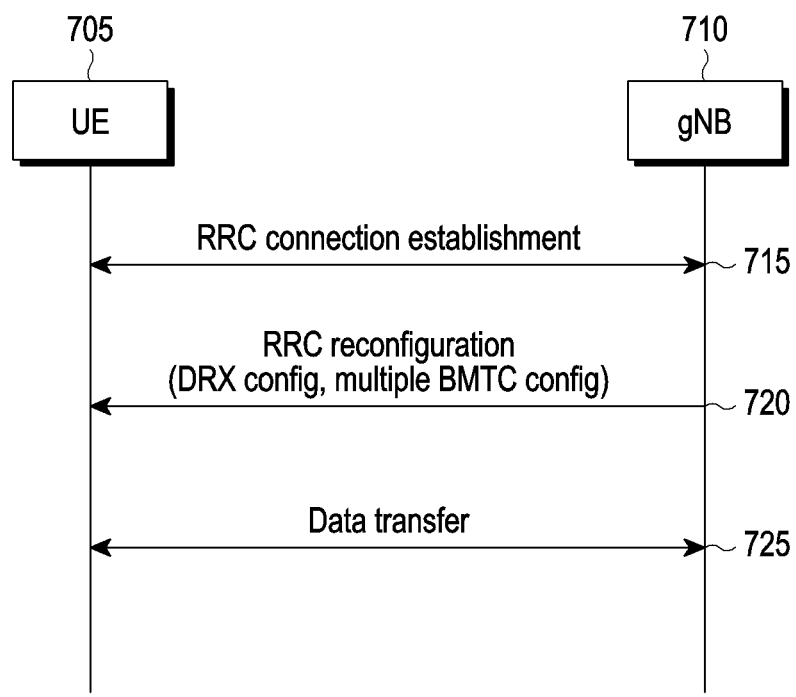
FIG. 7 is a flowchart for a terminal operation for beam management before active time according to an embodiment.

FIG. 7 is a flowchart for a terminal operation for beam management before active time according to an embodiment.

A terminal 705 may perform an RRC connection establishment operation with a base station 710 and transit into a connection mode (715). The base station may set DRX configuration information and beam management timing configuration for the terminal using an RRC reconfiguration message (720). The BMTC configuration information may include BMTC cycle information, a BMTC start time point, a beam management operation duration, and first, second, and third threshold information for determining whether to omit a beam switching procedure which are required to perform a beam management operation. The terminal may perform the beam management operation in a data transmission process using the configuration information (725).

Figure 8:
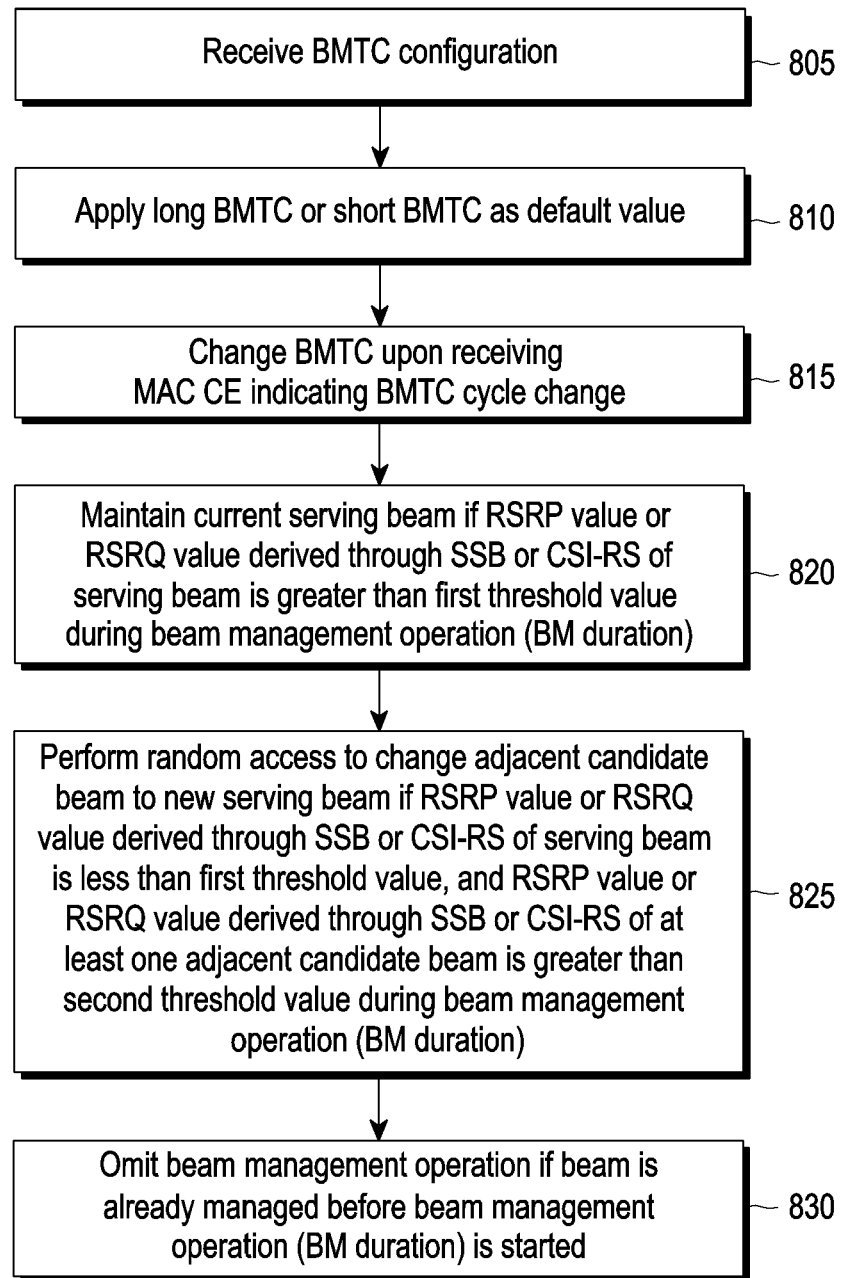
FIG. 8 is a flowchart for a terminal operation for beam management before active time according to an embodiment.

FIG. 8 is a flowchart for a terminal operation for beam management before active time according to an embodiment.

In operation 805, a terminal receives beam management timing configuration from a base station. The BMTC configuration information may include BMTC cycle information, a BMTC start time point, a beam management operation duration, and first, second, and third threshold information for determining whether to omit a beam switching procedure which are required to perform a beam management operation.

In operation 810, after receiving the configuration information, the terminal may apply a long BMTC cycle or a short BMTC cycle which is designated as a default value.

In operation 815, upon receiving a specific MAC CE indicating a BMTC cycle change, the terminal may change to an indicated BMTC cycle.

In operation 820, during the beam management operation (BM duration), if an RSRP value or an RSRQ value derived through an SSB or a CSI-RS of a serving beam is greater than a first threshold value, the terminal maintains the current serving beam and does not perform the beam switching procedure.

In operation 825, during the beam management operation (BM duration), if the RSRP value or the RSRQ value derived through the SSB or the CSI-RS of the serving beam is less than the first threshold value, and an RSRP value or an RSRQ value derived through an SSB or a CSI-RS of at least one adjacent candidate beam is greater than a second threshold value, the terminal may perform a random access in a network to change the adjacent candidate beam to a new serving beam.

If the RSRP values or the RSRQ values derived through the SSBs or the CSI-RSs of the serving beam and the adjacent candidate beam are less than the first and second threshold values, the terminal may perform a BFR operation.

In operation 830, if a beam is already managed before the beam management operation (BM duration) is started, the beam management operation may be omitted separately.

Figure 9:
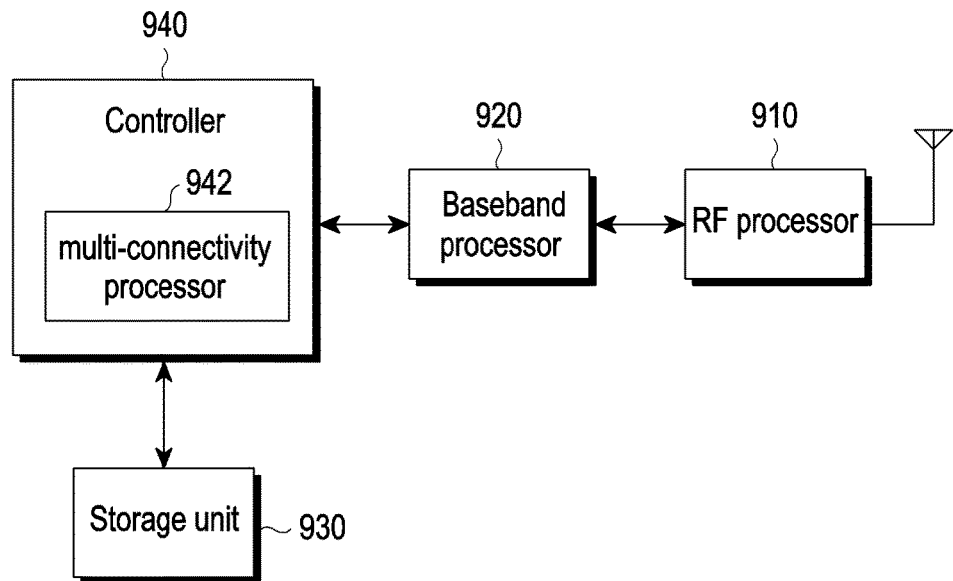
FIG. 9 is a block diagram illustrating an inner structure of a terminal according to an embodiment.

FIG. 9 is a block diagram illustrating an inner structure of a terminal according to an embodiment.

Referring to FIG. 9, the terminal may include a radio frequency (RF) processor 910, a baseband processor 920, a storage unit 930, and a controller 940.

The RF processor 910 may perform a function for transmitting and receiving a signal through a radio channel, such as band conversion, amplification, and/or the like for the signal. That is, the RF processor 910 may up-convert a baseband signal provided from the baseband processor 920 into an RF band signal, transmit the RF band signal through an antenna, and then down-convert an RF band signal received through the antenna into a baseband signal. For example, the RF processor 910 may include a transmission filter, a reception filter, an amplifier, a mixer, an oscillator, a digital-to-analog convertor (DAC), an analog-to-digital convertor (ADC), and/or the like. Although only one antenna is illustrated in FIG. 9, the terminal may include a plurality of antennas. The RF processor 910 may include a plurality of RF chains. Moreover, the RF processor 910 may perform beamforming. For the beamforming, the RF processor 910 may adjust a phase and a magnitude of each of signals transmitted and received through the plurality of antennas or antenna elements.

The RF processor may perform multiple-input and multiple-output (MIMO) and receive a plurality of layers upon performing a MIMO operation.

The baseband processor 920 may perform a function for a conversion between a baseband signal and a bit stream according to a physical layer standard of a system. For example, when data is transmitted, the baseband processor 920 may generate complex symbols by encoding and modulating a transmission bit stream. Further, when data is received, the baseband processor 920 may recover a reception bit stream by demodulating and decoding a baseband signal provided from the RF processor 910. For example, following an orthogonal frequency division multiplexing (OFDM) scheme, when data is transmitted, the baseband processor 920 may generate complex symbols by encoding and modulating a transmission bit stream, map the complex symbols to subcarriers, and then generate OFDM symbols through an inverse fast Fourier transform (IFFT) operation and cyclic prefix (CP) insertion. When data is received, the baseband processor 920 may divide a baseband signal provided from the processor 910 in a unit of OFDM symbol, recover signals mapped to subcarriers through a fast Fourier transform (FFT) operation, and then recover a reception bit stream through demodulation and decoding.

The baseband processor 920 and the RF processor 910 may transmit and receive a signal as described above. Accordingly, the baseband processor 920 and the RF processor 910 may be referred to as a transmitter, a receiver, a transceiver, or a communication unit. At least one of the baseband processor 920 and the RF processor 910 may include a plurality of communication modules to support a plurality of different radio access technologies. In addition, at least one of the baseband processor 920 and the RF processor 910 may include different communication modules to process signals of different frequency bands. For example, the different radio access technologies may include a wireless LAN (for example, IEEE 802.11), a cellular network (for example, LTE), and/or the like. The different frequency bands may include a super-high-frequency (SHF) (for example, 2 NRHz, and NRhz) band and a millimeter wave (mm wave) (for example, 60 GHz) band.

The storage unit 930 may store data such as a basic program, an application program, setting information, and/or the like for an operation of the terminal. The storage unit 930 may store information related to a second access node for performing a wireless communication using a second radio access technology. The storage unit 930 may provide stored data according to a request from the controller 940.

The controller 940 may control the overall operation of the terminal. For example, the controller 940 may transmit and receive a signal through the baseband processor 920 and the RF processor 910. The controller 940 records data in the storage unit 940 and reads the data. To this end, the controller 940 may include at least one processor. For example, the controller 940 may include a communication processor (CP) that performs a control for a communication, and an application processor (AP) that controls an upper layer such as an application program, etc.

According to an embodiment, the controller 940 may include a multi-connectivity processor 942 for processing an operation in a multi-connectivity mode. For example, the controller 940 may control the terminal to perform a procedure of an operation of a terminal illustrated in FIG. 3f.

According to an embodiment, the controller 940 of the terminal may control to transmit a preamble which corresponds to a corresponding beam or an entire cell if a request for system information is necessary, according to a parameter received from a base station.

Figure 10:
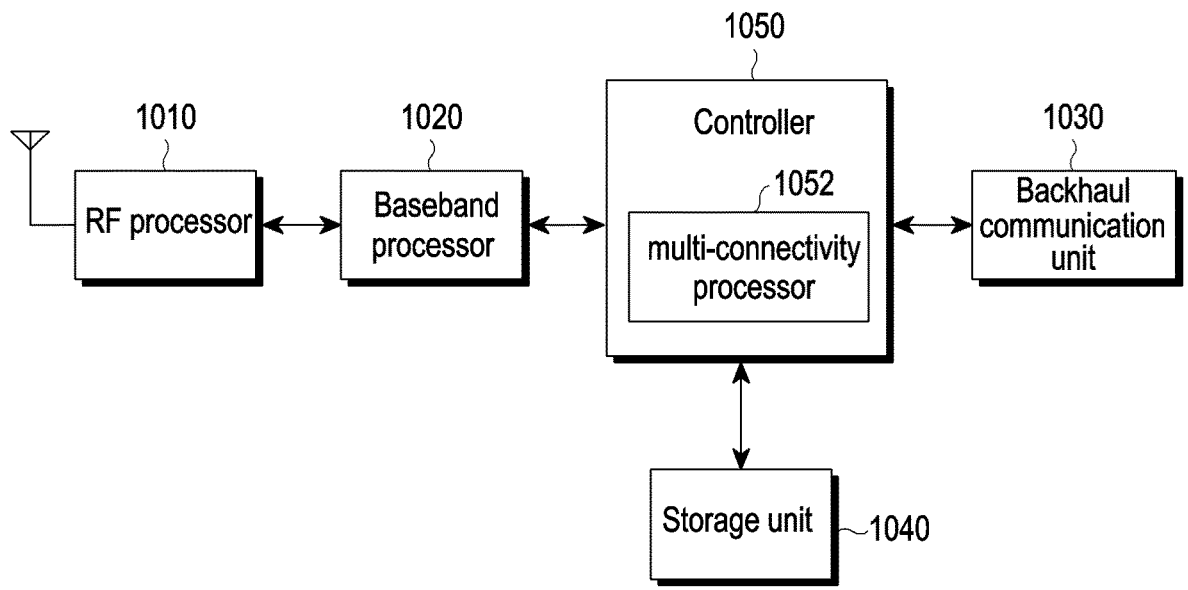
FIG. 10 is a block diagram illustrating a structure of a base station according to an embodiment.

FIG. 10 is a block diagram illustrating a structure of a base station according to an embodiment.

As illustrated in FIG. 10, the base station may include an RF processor 1010, a baseband processor 1020, a backhaul communication unit 1030, a storage unit 1040, and a controller 1050. The RF processor 1010, the baseband processor 1020, and the backhaul communication unit 1030 may be referred to as a transceiver.

The RF processor 1010 may perform a function for transmitting and receiving a signal through a radio channel, such as band conversion, amplification, and/or the like for the signal. That is, the RF processor 1010 may up-convert a baseband signal provided from the baseband processor 1020 into an RF band signal and then transmit the RF band signal through an antenna, and down-convert an RF band signal received through the antenna into a baseband signal. For example, the RF processor 1010 may include a transmission filter, a reception filter, an amplifier, a mixer, an oscillator, a DAC, an ADC, and/or the like. Although only one antenna is illustrated in FIG. 10, the first access node may include a plurality of antennas. The RF processor 1010 may include a plurality of RF chains. The RF processor 1010 may perform beamforming. For the beamforming, the RF processor 1010 may adjust a phase and a magnitude of each of signals transmitted and received through a plurality of antennas or antenna elements. The RF processor may perform a downlink MIMO operation by transmitting one or more layers.

The baseband processor 1020 may perform a conversion function between a baseband signal and a bit stream according to a physical layer standard of a first radio access technology. For example, upon transmitting data, the baseband processor 1020 may generate complex symbols by encoding and modulating a transmission bit stream. Further, upon receiving data, the baseband processor 1020 may recover a reception bit stream by demodulating and decoding a baseband signal provided from the RF processor 1010. For example, following an OFDM scheme, upon transmitting data, the baseband processor 1020 may generate complex symbols by encoding and modulating the transmission bit stream, map the complex symbols to subcarriers, and then generate OFDM symbols through an IFFT operation and CP insertion. In addition, upon receiving data, the baseband processor 1020 may divide a baseband signal provided from the RF processor 1010 in a unit of OFDM symbol, recover signals mapped to subcarriers through an FFT operation, and then recover a reception bit stream through demodulation and decoding. The baseband processor 1020 and the RF processor 1010 may transmit and receive a signal as described above. Accordingly, the baseband processor 1020 and the RF processor 1010 may be referred to as a transmitter, a receiver, a transceiver, a communication unit, or a wireless communication unit.

The backhaul communication unit 1030 may provide an interface for performing a communication with other nodes within a network. That is, the backhaul communication unit 1030 may convert a bit stream transmitted from the master base station to another node, for example, a secondary base station, or a core network, etc., into a physical signal, and convert a physical signal received from the other node into a bit stream.

The storage unit 1040 stores data such as a basic program, an application program, setting information, and/or the like for an operation of the master base station. The storage unit 1040 may store information about a bearer allocated to an accessed terminal, a measurement result reported from the accessed terminal, and/or the like. Further, the storage unit 1040 may store information which is a reference for determining whether to provide or stop multi-connectivity. The storage unit 1040 may provide stored data according to a request from the controller 1050.

The controller 1050 may control the overall operation of the master base station. For example, the controller 1050 may transmit and receive a signal through the baseband processor 1020 and the RF processor 1010 or through the backhaul communication unit 1030. The controller 1050 may record data in the storage unit 1040 and read the data. To this end, the controller 1050 may include at least one processor.

Figure 11:
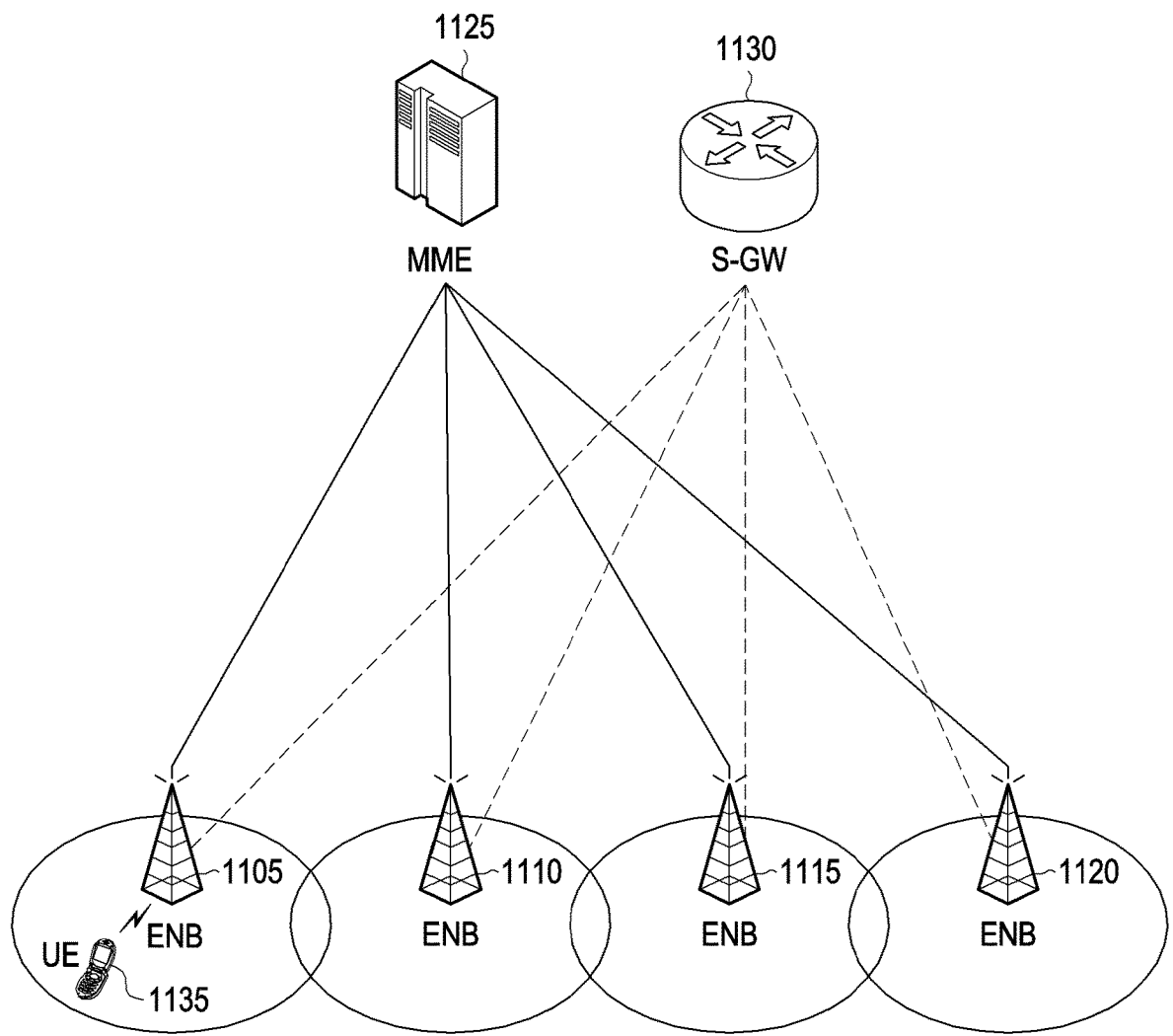
FIG. 11 is a diagram illustrating a structure of an LTE system according to an embodiment.

FIG. 11 is a diagram illustrating a structure of an LTE system according to an embodiment.

Referring to FIG. 11, as shown in FIG. 11, a radio access network of an LTE system may include next-generation base stations (hereinafter, referred to as evolved node Bs (eNBs), node Bs, or base stations) 1105, 1110, 1115, and 1120, a mobility management entity (MME) 1125, and a serving-gateway (S-GW) 1130. A user terminal (hereinafter, referred to as a user equipment (UE), or a terminal) 1135 may access an external network through the eNBs 1105 to 1120 and the S-GW 1130.

In FIG. 11, the eNBs 1105 to 1120 may correspond to an existing node B of a UMTS system. An eNB is connected to the UE 1135 via a radio channel and may perform a more complicated role than the existing node B. In an LTE system, all user traffic including a real-time service such as voice over IP (VoIP) through an internet protocol is served through a shared channel, so a device for collecting state information such as buffer states, available transmission power states, channel states, and/or the like of UEs and scheduling the UEs is needed, the eNBs 1105 to 1120 may be in charge of this. One eNB may generally control a plurality of cells. The LTE system may use an orthogonal frequency division multiplexing (OFDM) scheme as a radio access technology in, for example, a 20 MHz bandwidth in order to implement, for example, a transmission rate of 100 Mbps. Further, an adaptive modulation & coding (AMC) scheme which determines a modulation scheme and a channel coding rate corresponding to a channel state of a terminal may be applied.

The base stations 1105, 1110, 1115, and 1120 are access nodes of a cellular network, and may provide a radio access to terminals which access a network. That is, in order to serve traffic of users, the base stations 1105, 1110, 1115, and 1120 may collect state information such as buffer states, available transmission power states, and channel states of the terminals and schedule the terminals to support a connection between the terminals and a core network (CN).

The S-GW 1130 is a device providing a data bearer, and may generate or a release a data bearer under a control of the MME 1125. The MME 1125 is a device which is in charge of various control functions as well as a mobility management function for a terminal, and may be connected to a plurality of base stations. The MME 1125 and the S-GW 1130 may further perform authentication for a terminal which accesses a network, bearer management, etc., and process a packet received from the base stations 1105, 1110, 1115, and 1120 or a packet to be transmitted to the base stations 1105, 1110, 1115, and 1120.

Figure 12:
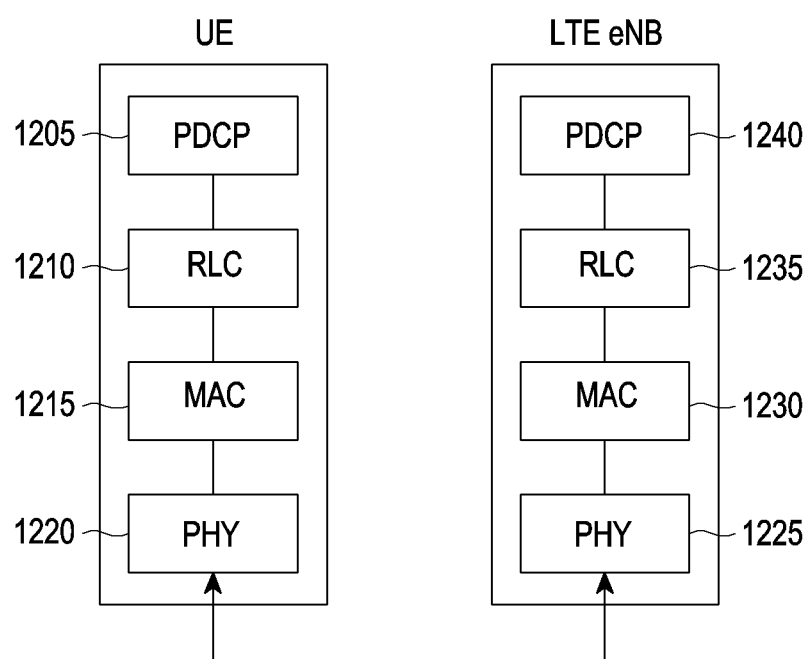
FIG. 12 is a diagram illustrating a radio protocol structure in an LTE system according to an embodiment.

FIG. 12 is a diagram illustrating a radio protocol structure in an LTE system according to an embodiment.

Referring to FIG. 12, a terminal (a UE) and an LTE eNB include packet data convergence protocols (PDCPs) 1205 and 1240, radio link controls (RLCs) 1210 and 1235, and medium access controls (MACs) 1215 and 1230, respectively, in a radio protocol of the LTE system. The PDCPs 1205 and 1240 may be in charge of an operation such as compressing/restoring an IP header, etc. Main functions of a PDCP may be summarized as follows.

Header compression and decompression function (Header compression and decompression: ROHC only)

User data transfer function (Transfer of user data)

In-sequence delivery function (In-sequence delivery of upper layer PDUs at PDCP re-establishment procedure for RLC AM)

Reordering function (For split bearers in DC (only support for RLC AM): PDCP PDU routing for transmission and PDCP PDU reordering for reception)

Duplicate detection function (Duplicate detection of lower layer SDUs at PDCP re-establishment procedure for RLC AM)

Retransmission function (Retransmission of PDCP SDUs at handover and, for split bearers in DC, of PDCP PDUs at PDCP data-recovery procedure, for RLC AM)

Ciphering and deciphering function (Ciphering and deciphering)

Timer-based SDU discard function (Timer-based SDU discard in uplink)

The radio link controls (RLCs) 1210 and 1235 may reconfigure [a PDCP packet data unit (PDU) to be a proper size to perform an ARQ operation, etc. Main functions of an RLC may be summarized as follows.

Data transfer function (Transfer of upper layer PDUs)

ARQ function (Error Correction through ARQ (only for AM data transfer))

Concatenation, segmentation, and reassembly function (Concatenation, segmentation and reassembly of RLC SDUs (only for UM and AM data transfer))

Re-segmentation function (Re-segmentation of RLC data PDUs (only for AM data transfer))

Reordering function (Reordering of RLC data PDUs (only for UM and AM data transfer)

Duplicate detection function (Duplicate detection (only for UM and AM data transfer))

Error detection function (Protocol error detection (only for AM data transfer))

RLC SDU discard function (RLC SDU discard (only for UM and AM data transfer))

RLC re-establishment function (RLC re-establishment)

The MACs 1215 and 1230 are connected to various RLC layer devices configured in one terminal, and may perform an operation of multiplexing RLC PDUs into a MAC PDU and demultiplexing a MAC PDU into RLC PDUs. Main functions of a MAC may be summarized as follows.

Mapping function (Mapping between logical channels and transport channels)

Multiplexing and demultiplexing function (Multiplexing/demultiplexing of MAC SDUs belonging to one or different logical channels into/from transport blocks (TB) delivered to/from the physical layer on transport channels)

Scheduling information reporting function (Scheduling information reporting)

HARQ function (Error correction through HARQ)

Logical channel priority control function (Priority handling between logical channels of one UE)

Terminal priority control function (Priority handling between UEs by means of dynamic scheduling)

MBMS service identification function (MBMS service identification)

Transport format selection function (Transport format selection)

Padding function (Padding)

Physical layers 1220 and 1225 may perform an operation for channel-coding and modulating upper layer data to generate an OFDM symbol and transmitting the OFDM symbol through a radio channel, or demodulating and channel-decoding an OFDM symbol received through a radio channel and transferring the demodulated and channel-decoded OFDM symbol to a upper layer.

Further, in a physical layer, hybrid ARQ (HARQ) is used for additionally correcting an error, and a receiving end may transmit whether a packet transmitted by a transmitting end is received using 1 bit. This will be referred to as HARQ ACK/NACK information. Downlink HARQ ACK/NACK information for uplink transmission may be transmitted through a physical hybrid-ARQ indicator channel (PHICH) physical channel, and uplink HARQ ACK/HARQ information for downlink transmission may be transmitted through a physical uplink control channel (PUCCH) or a physical uplink shared channel (PUSCH) physical channel.

A HARQ transmission scheme includes asynchronous HARQ and synchronous HARQ. The asynchronous HARQ is a scheme in which timing at which retransmission for failure of (re)transmission occurs is not fixed if the (re)transmission fails, and the synchronous HARQ is a scheme in which timing at which retransmission for failure of (re)transmission occurs is fixed (for example, 8 ms) if the (re)transmission fails. In addition, a plurality of transmissions and receptions may be performed simultaneously in parallel for a downlink and an uplink for one terminal, and each transmission may be identified by an HARQ process identifier.

Meanwhile, in the asynchronous HARQ, retransmission timing is not determined, so a base station may provide information indicating that corresponding transmission belongs to which HARQ process and information indicating whether the corresponding transmission is initial transmission or retransmission, for each retransmission, through a physical downlink control channel (PDCCH) physical channel. In more detail, the information indicating which HARQ process that the corresponding transmission belongs to may be transmitted through an HARQ Process ID field within the PDCCH. The information indicating whether the corresponding transmission is the initial transmission or the retransmission may mean the retransmission if a value of a new data indicator (NDI) bit within the PDCCH is not changed compared to an existing value, and mean the initial transmission if the value of the NDI bit is changed to another value. Accordingly, the terminal may identify the details of the corresponding transmission by receiving resource allocation information within the PDCCH transmitted by the base station to receive actual data through a physical downlink shared channel (PDSCH) physical channel in a downlink and transmit actual data through a physical uplink shared channel (PUSCH) physical channel in an uplink.

Although not illustrated in FIG. 12, there is a radio resource control (RRC) layer above each of the PDCP layers 1205 and 1240 of the terminal and the base station, and the RRC layer may transmit and receive a configuration control message related to an access and measurement for controlling a radio resource.

Figure 13:
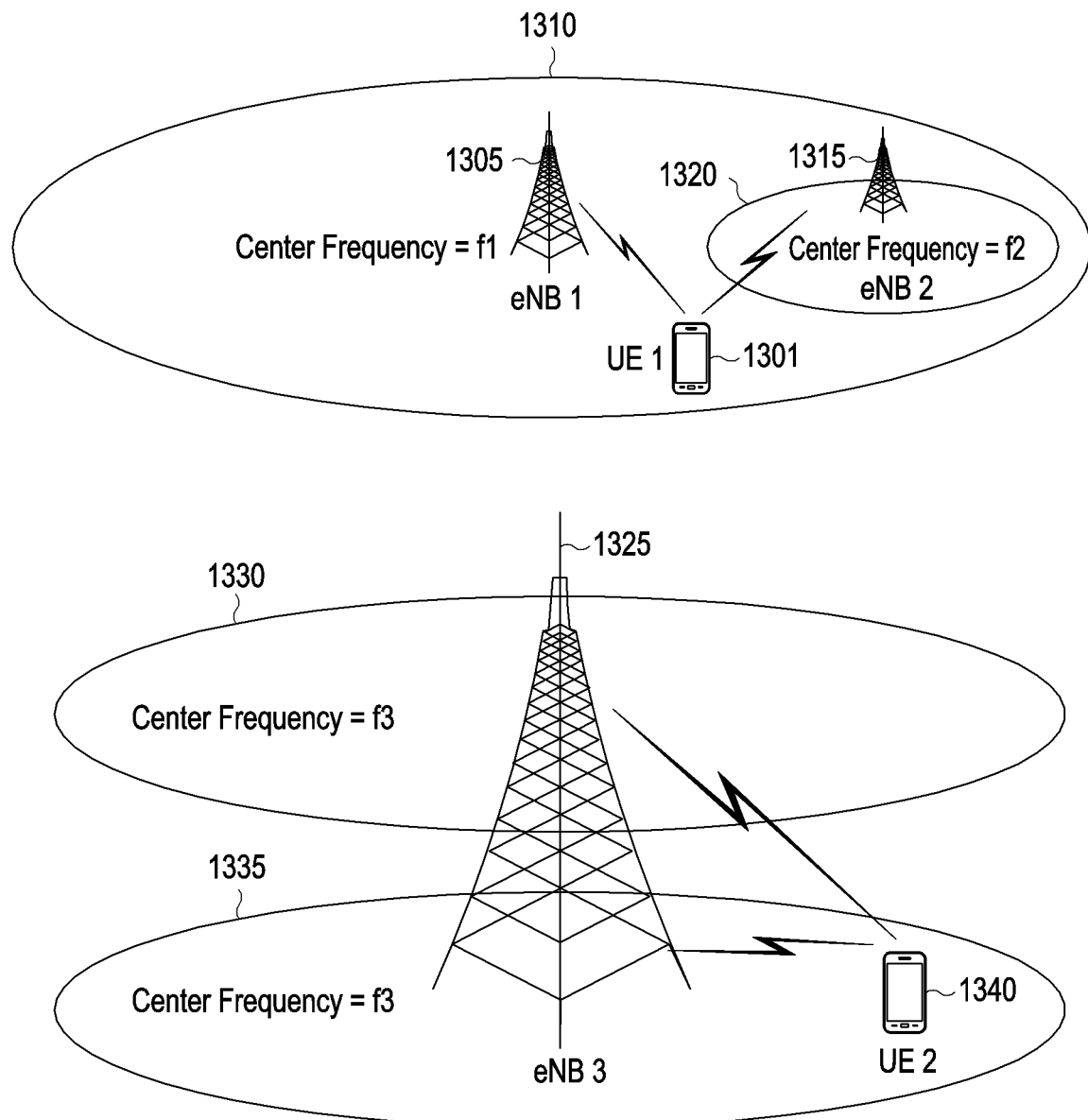
FIG. 13 is a diagram schematically illustrating a multi-connectivity and carrier aggregation operation of an LTE system according to an embodiment.

FIG. 13 is a diagram schematically illustrating a multi-connectivity and carrier aggregation operation of an LTE system according to an embodiment.

Referring to FIG. 13, when a base station 1 1305 transmits/receives a carrier of which a center frequency is f1 and a base station 2 1315 transmits/receives a carrier of which the center frequency is f2, if a terminal 1 1301 aggregates a carrier of which a forward center frequency is f1 and a carrier of which the forward center frequency is f2, one terminal may perform a transmitting/receiving operation with two or more base stations. An LTE system supports the above operation, and the operation is called multi-connectivity (dual connectivity (DC), hereinafter, referred to as DC).

In addition, one base station 3 may generally transmit and receive multiple carriers across multiple frequency bands. For example, when a carrier 1330 of which a forward center frequency is f3 and a carrier 1335 of which the forward center frequency is f4 are transmitted from the base station 3 1325, one terminal 2 1340 has conventionally transmitted and received data using one of the two carriers. However, a terminal 2 having a carrier aggregation capability may transmit and receive data through multiple carriers at the same time. The base station 3 1325 may increase a transmission rate for the terminal 2 1340 by allocating more carriers to the terminal 2 1340 having the carrier aggregation capability according to circumstances. Aggregation of a forward carrier and reverse carriers which are transmitted and received by one base station as described above is called intra-base station carrier aggregation (CA). In a traditional sense, when one forward carrier transmitted by one base station and one reverse carrier received by the base station constitute one cell, carrier aggregation may be understood as a case that a terminal transmits and receives data through multiple cells simultaneously. Through this, a maximum transmission rate may be increased in proportion to the number of carriers to be aggregated.

In the following embodiments, a fact that a terminal receives data through an arbitrary forward carrier or transmits data through an arbitrary uplink carrier has the same meaning as a fact that the terminal transmits/receives data using a control channel and a data channel provided by a cell which corresponds to a center frequency and a frequency band that characterize the carrier. In embodiments, a set of serving cells controlled by the same base station may be defined as a cell group (CG). The cell group may be further classified into a master cell group (MCG) and a secondary cell group (SCG). The MCG may mean a set of serving cells controlled by a base station (master eNB (MeNB)) which controls a primary cell (PCell), and the SCG may mean a set of serving cells controlled by a base station which is not the base station controlling the PCell, i.e., a base station (secondary eNB (SeNB)) which controls only secondary cells (SCells). A base station informs a terminal of whether a specific serving cell belongs to an MCG or an SCG in a process of configuring the corresponding serving cell.

The terms PCell and SCell may be terms indicating a type of a serving cell configured in a terminal. There are some differences between a PCell and an SCell. For example, the PCell always maintains an active state, but the SCell may repeat the active state and an inactive state according to indication of a base station. Mobility of the terminal is controlled based on the PCell, and the SCell may be understood as an additional serving cell for data transmission and reception. As an embodiment, the PCell and the SCell may mean a PCell and an SCell defined in LTE standards 36.331, or 36.321, etc. The terms have the same meaning as used in an LTE mobile communication system. In the present disclosure, terms such as a carrier, a component carrier, a serving cell, etc., may be used interchangeably.

Referring back to FIG. 13, if the base station 1 1305 is an MeNB and the base station 2 1315 is an SeNB, a serving cell 1310 with a center frequency f1 is a serving cell which belongs to an MCG and a serving cell 1320 with a center frequency f2 is a serving cell which belongs to an SCG. In addition, it may be practically impossible to transmit HARQ feedback and channel state information (CSI) of SCG SCells through a physical uplink control channel (PUCCH) of a PCell. The HARQ feedback needs to be delivered within HARQ round trip time (RTT) (typically 8 ms) because transmission delay between the MeNB and the SeNB may be longer than the HARQ RTT. Due to the above problem, a PUCCH transmission resource is set in one cell of SCells which belongs to the SCG, i.e., a primary SCell (PSCell), and HARQ feedback, CSI, etc., for the SCG SCells may be transmitted through the PUCCH.

In addition, in conventional intra-base station CA of the base station 3 1325 the terminal 2 1340 may transmit HARQ feedback and CSI for a PCell as well as HARQ feedback and CSI for an SCell through a PUCCH of the PCell. This is for applying CA operation to a terminal incapable of uplink simultaneous transmission. In LTE Rel-13 enhanced CA (eCH), an additional SCell having a PUCCH is defined and up to 32 carriers may be aggregated.

Figure 14:
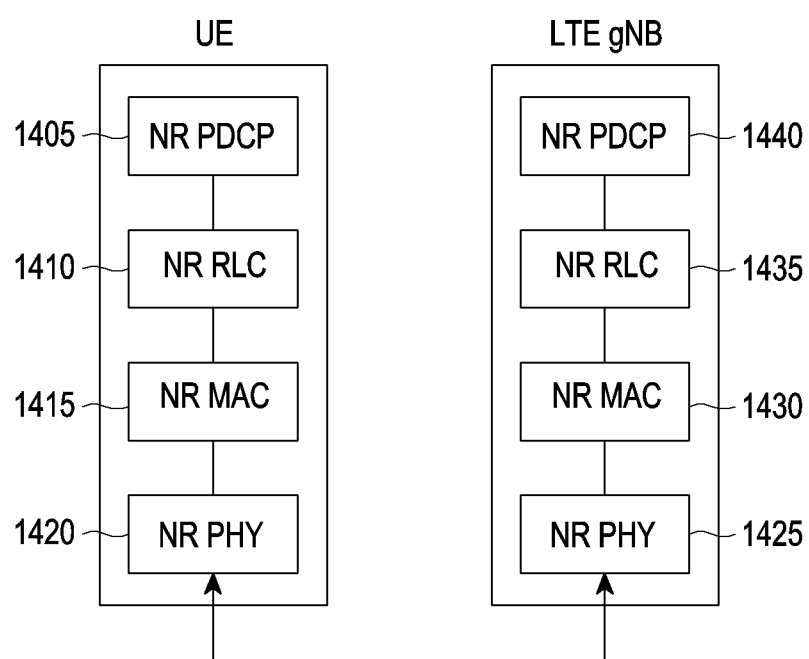
FIG. 14 is a diagram illustrating a radio protocol structure in a 5G system according to an embodiment.

FIG. 14 is a diagram illustrating a radio protocol structure in a 5G system according to an embodiment.

Referring to FIG. 14, a terminal and an NR base station may include NR PDCPs 1405 and 1440, NR RLCs 1410 and 1435, and NR MACs 1415 and 1430, respectively, in a radio protocol of a next-generation mobile communication system. Main functions of the NR PDCPs 1405 and 1440 may include some of the following functions.

Header compression and decompression function (Header compression and decompression: ROHC only)

User data transfer function (Transfer of user data)

In-sequence delivery function (In-sequence delivery of upper layer PDUs)

Reordering function (PDCP PDU reordering for reception)

Duplicate detection function (Duplicate detection of lower layer SDUs)

Retransmission function (Retransmission of PDCP SDUs)

Ciphering and deciphering function (Ciphering and deciphering)

Timer-based SDU discard function (Timer-based SDU discard in uplink)

The reordering function of the NR PDCPs 1405 and 1440 is a function of sequentially reordering PDCP PDUs received from a lower layer based on a PDCP sequence number (SN) and may include a function of delivering data to a upper layer according to a reordered order, a function of reordering an order to record lost PDCP PDUs, a function of performing a state report for the lost PDCP PDUs to a transmitting side, and a function of requesting retransmission for the lost PDCP PDUs.

Main functions of the NR RLCs 1410 and 1435 may include some of the following functions.

Data transfer function (Transfer of upper layer PDUs)

In-sequence delivery function (In-sequence delivery of upper layer PDUs)

Out-of-sequence delivery function (Out-of-sequence delivery of upper layer PDUs)

ARQ function (Error correction through ARQ)

Concatenation, segmentation, and reassembly function (Concatenation, segmentation and reassembly of RLC SDUs)

Re-segmentation function (Re-segmentation of RLC data PDUs)

Reordering function (Reordering of RLC data PDUs)

Duplicate detection function (Duplicate detection)

Error detection function (Protocol error detection)

RLC SDU discard function (RLC SDU discard)

RLC re-establishment function (RLC re-establishment)

The in-sequence delivery function of the NR RLCs 1410 and 1435 is a function of delivering RLC SDUs received from a lower layer to a upper layer in sequence and may include a function of reassembling and delivering a plurality of RLC SDUs when one original RLC SDU is divided into the plurality of RLC SDUs and then received, a function of reordering received RLC PDUs based on an RLC sequence number (SN) or a PDCP sequence number (SN), a function of reordering an order to record lost RLC PDUs, a function of performing a state report for the lost RLC PDUs to a transmitting side, a function of requesting retransmission for the lost RLC PDUs, a function of delivering only RLC SDUs before a lost RLC SDU to the upper layer in sequence if there is the lost RLC SDU, a function of delivering all RLC SDUs which are received before a predetermined timer starts to the upper layer in sequence if the predetermined timer expires even though there is the lost RLC SDU, or a function of delivering all RLC SDUs which are received up to now to the upper layer in sequence if the predetermined timer expires even though there is the lost RLC SDU. Further, the NR RLCs 1410 and 1435 may process the RLC PDUs according to a reception order thereof (according to an arrival order regardless of a serial number or a sequence number) to deliver the processed RLC PDUs to a PDCP device regardless of an order thereof (Out-of sequence delivery), and, for a case of segment, may receive segments which are stored in a buffer or will be received later to reconfigure one complete RLC PDU, process the RLC PDU and deliver the processed RLC PDU to the PDCP device. The NR RLC layer may not include a concatenation function, and the function may be performed by an NR MAC layer or may be replaced with a multiplexing function of the NR MAC layer.

The out-of-sequence delivery function of the NR RLCs 1410 and 1435 is a function of delivering RLC SDUs received from a lower layer directly to a upper layer regardless of an order thereof, and may include a function of reassembling a plurality of RLC SDUs to deliver the reassembled RLC SDUs if one original RLC SDU is divided into the plurality of RLC SDUs and then received, and a function of storing RLC SNs or PDCP SNs of received RLC PDUs, and reordering an order to record lost RLC PDUs.

The NR MACs 1415 and 1430 may be connected to a plurality of NR RLC layer devices configured in one terminal, and main functions of the NR MACs 1415 and 1430 may include some of the following functions.

Mapping function (Mapping between logical channels and transport channels)

Multiplexing and demultiplexing function (Multiplexing/demultiplexing of MAC SDUs)

Scheduling information reporting function (Scheduling information reporting)

HARQ function (Error correction through HARQ)

Logical channel priority control function (Priority handling between logical channels of one UE)

Terminal priority control function (Priority handling between UEs by means of dynamic scheduling)

MBMS service identification function (MBMS service identification)

Transport format selection function (Transport format selection)

Padding function (Padding)

NR PHY layers 1420 and 1425 perform an operation for channel-coding and modulating upper layer data to generate an OFDM symbol and transmitting the OFDM symbol through a radio channel, or demodulating and channel-decoding an OFDM symbol received through a radio channel and delivering the demodulated and channel-decoded OFDM symbol to the upper layer.

Figure 15:
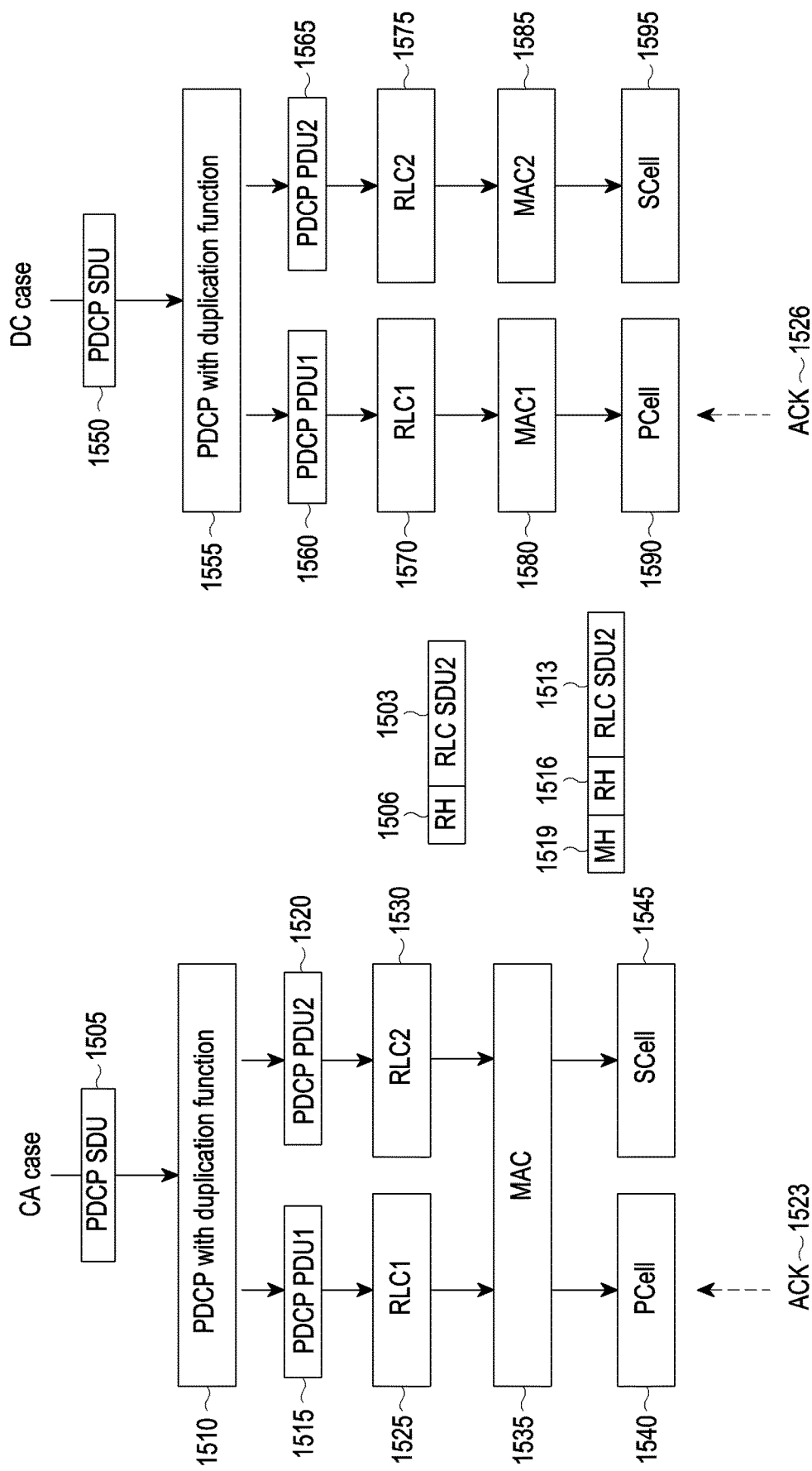
FIG. 15 is a diagram for schematically describing data transmission through packet duplication according to an embodiment.

FIG. 15 is a diagram for schematically describing data transmission through packet duplication according to an embodiment.

The present disclosure is a method of delivering duplicated data through a path (or expressed in leg) different from an original packet when a terminal performs a packet duplication function to support an ultra-reliable low latency communication (URLLC) in a next-generation mobile communication system. If the duplicated data is allocated to the same MAC PDU, duplication transmission is impossible, so in a case that a packet is duplicated, multi-connectivity (dual connectivity (DC)) or carrier aggregation (CA) may be used by default. That is, the terminal needs to be in a state in which an SgNB or an SCell is configured with the terminal to support the multi-connectivity or the carrier aggregation.

In the present disclosure, a situation in which multi-connectivity and carrier aggregation are configured is assumed, and a basic principle will be described using a packet processing method per protocol structure in each case.

Referring back to FIG. 15, a base station or a terminal may receive a data packet for a URLLC, i.e., PDCP SDUs from an upper layer (1505 and 1550), and deliver the PDCP SDUs to a PDCP layer. In operations 1510 and 1555, a PDCP may determine whether to duplicate a corresponding data packet, and, if duplication is required, generate an original PDCP PDU1 and a duplicated PDCP PDU2 (1515, 1520, 1560, and 1565) to deliver the original PDCP PDU1 and the duplicated PDCP PDU2 to an RLC layer (1525, 1530, 1570, and 1575). The determination of packet duplication in the above operation may be performed with packet duplication activation/deactivation MAC CE (hereinafter, referred to as Du A/D MAC CE) received from the base station. An RLC1 and an RLC2 of each serving cell may deliver a received data packet to a MAC layer of an MgNB or the terminal. The MAC layers may map packet data received in operations 1535, 1580, and 1585 (in a case of CA, there may be one MAC, and, in a case of DC, there may be two MACs) to an appropriate logical channel group (LCG), generate MAC PDUs, and deliver the MAC PDUs to physical layers 1540, 1545, 1590, and 1595 of a corresponding serving cell. It will be noted that an original packet and a duplicated packet are not generated as the same MAC PDU in the above MAC operation. Thereafter, the physical layers transmit the MAC PDUs received through the corresponding carrier aggregation or multi-connectivity, and a reception process may perform a reverse process of the transmission process as it is. That is, the physical layers may receive data packets (MAC PDUs) through the corresponding serving cells and deliver the data packets (the MAC PDUs) to the MAC layers of the terminal or the corresponding base station. Subsequently, a PDCP PDU1 and a PDCP PDU2 through RLCs are gathered to PDCPs of the terminal or the base station, and the PDCPs may identify sequence numbers (SNs) of a received original packet and a received duplicated packet, discard one of the same packets if the same packets are received, and deliver a remaining packet to a upper layer.

In a case that packet duplication deactivation is indicated to the terminal when the above operation is performed, the present embodiment may define how the terminal operates in a corresponding situation.

The following embodiments propose a solution to a problem of how to process a duplicated packet already stored in RLC or MAC at a corresponding time point if a terminal receives a packet duplication deactivation MAC CE from a base station. In particular, it is possible to consider processing of a packet stored in a transmission buffer and a packet stored in a retransmission buffer for the corresponding operation. In addition, it deals with a detailed operation in an RLC entity to perform the corresponding operation.

Figure 16:
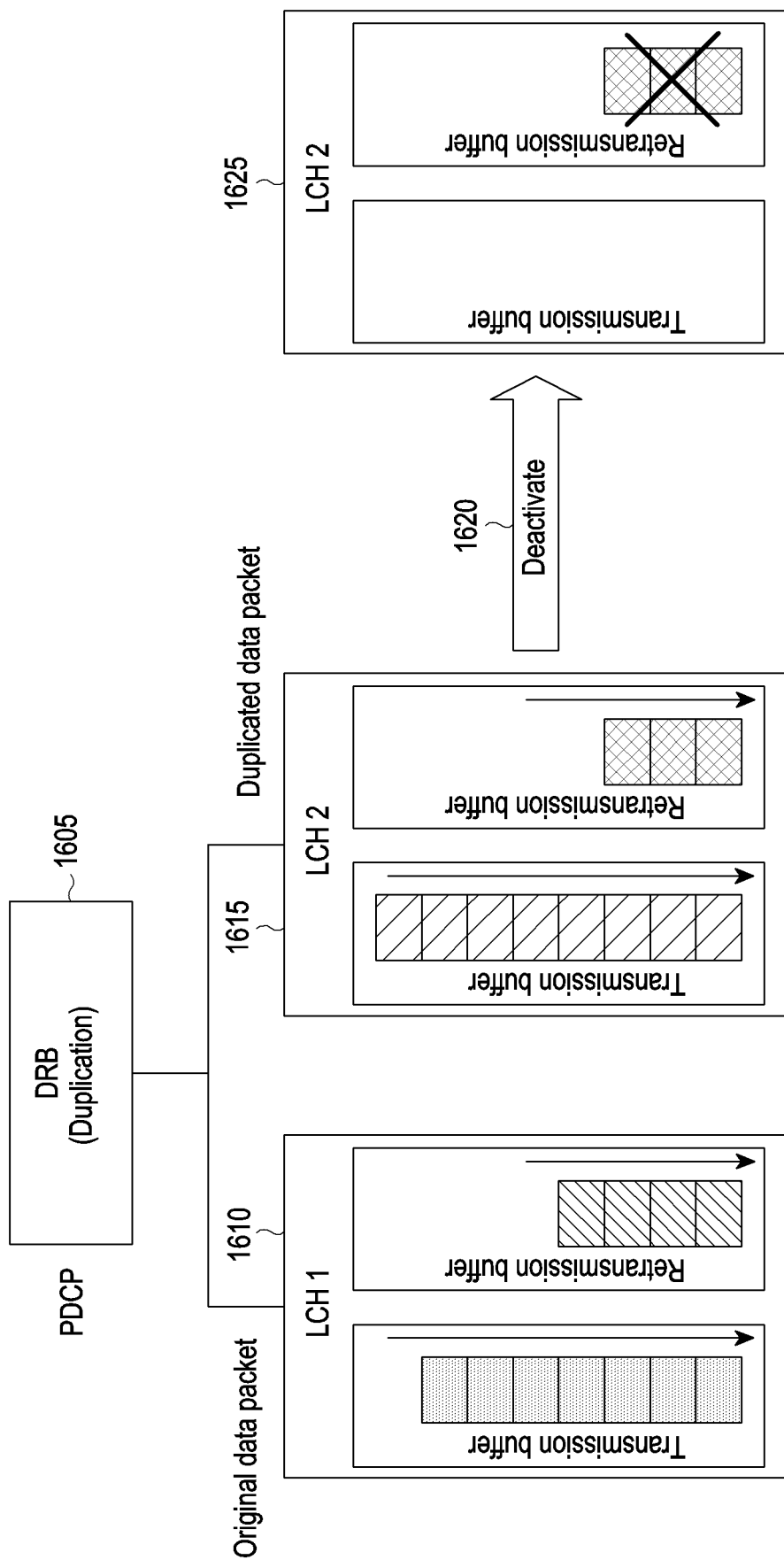
FIG. 16 is a diagram illustrating a secondary RLC entity operation of a terminal in a case that the terminal receives a packet duplication deactivation MAC CE from a base station according to an embodiment.

FIG. 16 is a diagram illustrating a secondary RLC entity operation of a terminal in a case that the terminal receives a packet duplication deactivation MAC CE from a base station according to an embodiment.

As described above, a base station or a terminal may receive a data packet for a URLLC, i.e., a PDCP SDU from an upper layer, and deliver the data packet to a PDCP layer. If packet duplication in a specific DRB 1605 is already set through an RRC message, and a packet duplication operation is performed through a MAC CE which activates the packet duplication, an original data packet and a duplicated data packet may be duplicated in a corresponding PDCP layer and delivered to each RLC entity. The RLC entity may be identified by a logical channel (LCH), and it may be indicated in RRC configuration that an original packet and a duplicated packet will be delivered to which LCH.

If the original data packet is set to an LCH 1 1610, and the duplicated data is active and set to an LCH 2 1615, a data packet may be delivered to a corresponding LCH. The LCH 1 1610 and the LCH 2 1615 may store a packet to be transmitted and a packet to be retransmitted in a transmission buffer and a retransmission buffer, respectively, and sequentially deliver the packet to be transmitted and the packet to be retransmitted to a lower layer. A data packet which is remained without being transmitted to the retransmission buffer may mean a data packet which is transmitted and for which ACK is not received from a receiving end.

Upon receiving a packet duplication deactivation MAC CE for the corresponding LCH 2 1615 while the packet duplication activation operation as described above is performed (1620), that is, upon receiving indication of packet duplication for the corresponding DRB 1605, the terminal needs to determine how to process packets stored in a transmission buffer and a retransmission buffer of an LCH 2 1625. The present disclosure proposes the following operation.

Stop delivery of a duplicated packet stored in the transmission buffer of the LCH 2 1625 (the corresponding packet is discarded from the buffer)

Duplicated packet stored in the retransmission buffer of the LCH 2 1625

Option 1: Stop retransmission for all RLC PDUs after reception of a packet duplication deactivation MAC CE Option 2: Stop only retransmission for an RLC data PDU after reception of packet duplication deactivation MAC CE (retransmission for a RLC control PDU is continuously performed, that is, only the RLC control PDU is left in a corresponding RLC retransmission buffer, and other RLC data PDUs are discarded)

The RLC control PDU means a control packet, not a data packet, and may include a STATUS PDU. The STATUS PDU is used at a receiving end in an AN RLC entity, and may be used to inform an RLC AM entity in a transmitting end of RLC data PDUs which are currently received and RLC data PDUs which are not received and then lost. The RLC control PDU is for delivering information about received packets to a transmitting end, so the RLC control PDU may be delivered even though packet duplication is deactivated.

In addition, a detailed operation performed by the secondary RLC entity (LCH 2 1625) is defined as a second operation, and is summarized as follows.

Discard all RLC PDUs which are stored without being delivered to a transmission buffer and process RLC SDU packets which are stored without being delivered to a retransmission buffer Option 1: Discard RLC SDU segments and all RLC PDUs from a retransmission buffer in a corresponding RLC entity Option 2: Discard all RLC data PDUs and RLC SDU segments except for an RLC control PDU from a retransmission buffer in a corresponding RLC entity Stop or reset operations of all timers related to transmission T-PollRetransmit timer (herein, t-PollRetransmit which is a timer used in a transmitting end of an AM RLC entity is a timer for transmitting a pool. That is, the pool is not transmitted because no more RLC PDUs are transmitted through a corresponding RLC.)

Reset all state values (state variables) and counter values related to transmission to initial values
  RLC AM
  : TX_Next_Ack, TX_Next, POLL_SN, PDU_WITHOUT_POLL, BYTE_WITHOUT_POLL, and RETX_COUNT
  RLC UM
  :TX_Next The state values and the counter values have the following meanings.

TX_Next_Ack—Acknowledgement state variable
  :This state variable designates an SN value of the next RLC SDU in which a positive ACK is to be received in order, and may operate as a lower edge of a window in an RLC AM transmission window operation. This variable is initially set to 0, and may be updated if an AM RLC entity receives a positive ACK of an RLC SDU of which an SN is TX_Next_Ack.
  TX_Next—Delivery state variable (Send state variable)
  :This state variable may be designated as a value for allocating an SN for an AMD PDU which is newly generated after AMD PDUs which are currently generated. This variable is initially set to 0, and may be updated if an AM RLC entity delivers an AMD PDU of which an SN is TX_Next.
  POLL_SN—Poll delivery state variable (Poll send state variable)
  :This state variable may be designated to a value TX_Next-1 if a poll bit of the most recently delivered AMD PDU is set to "1".
  PDU_WITHOUT_POLL—counter
  :This counter variable counts the number of AMD PDUs delivered after a poll bit which is most recently delivered. This variable may be initially set to 0.
  BYTE_WITHOUT_POLL—counter
  :This counter variable counts the number of data bytes delivered after a poll bit which is most recently delivered. This variable may be initially set to 0.
  RETX_COUNT—counter
  :This counter variable counts the number of retransmissions for an AMD PDU. At least one RETX_COUNT may exist for a retransmitted PDY.

The proposed RLC entity operation in a case of receiving the packet duplication deactivation MAC CE is similar to an RLC re-establishment operation, but shows a slight difference. If the RLC re-establishment operation is called a first operation, it may be summarized as follows. It may be characterized that the RLC re-establishment operation of the RRC message may include all of re-establishment for primary RLC and re-establishment for secondary RLC.

Discard all RLC SDU segments and RLC PDUs which are stored without being delivered to a transmission buffer and a retransmission buffer
  Stop or reset operations of all timers related to transmission
  T-PollRetransmit timer (herein, t-PollRetransmit which is a timer used in a transmitting end of an AM RLC entity is a timer for transmitting a pool. That is, the pool is not transmitted because no more RLC PDUs are transmitted through a corresponding RLC.)
  Reset all state values (state variables) and counter values related to transmission to initial values
  RLC AM
  : TX_Next_Ack, TX_Next, POLL_SN, PDU_WITHOUT_POLL, BYTE_WITHOUT_POLL, and RETX_COUNT
  RLC UM
  :TX_Next In a current standard, the RLC re-establishment operation as described above is defined to reset only all state values related to transmission to initial values, but also an operation of resetting all counter values to initial values needs to be performed.

Figure 17A:
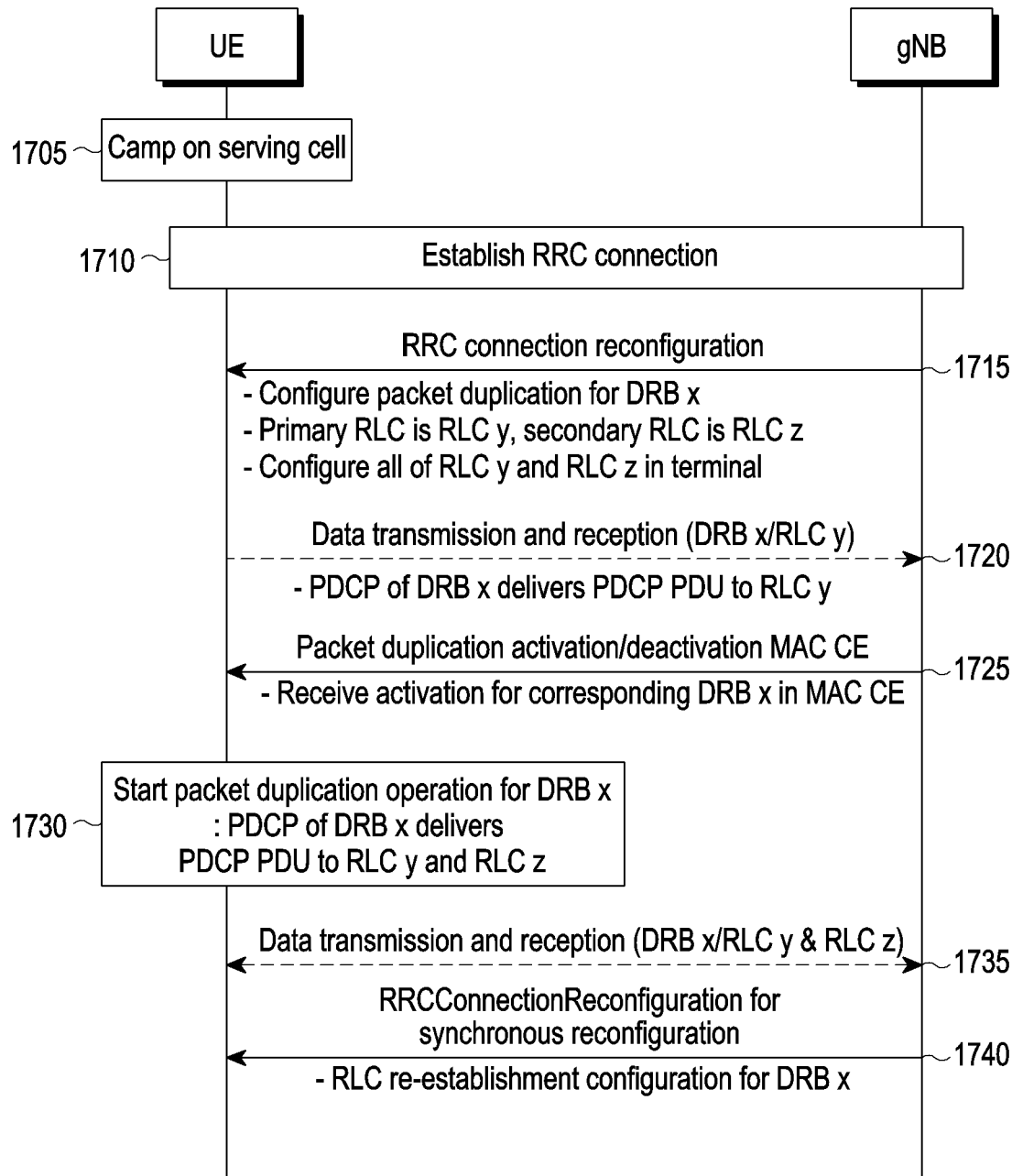
FIG. 17a and FIG. 17b are diagrams illustrating an overall operation in a case of reception of a packet duplication deactivation MAC CE according to an embodiment.
Figure 17B:
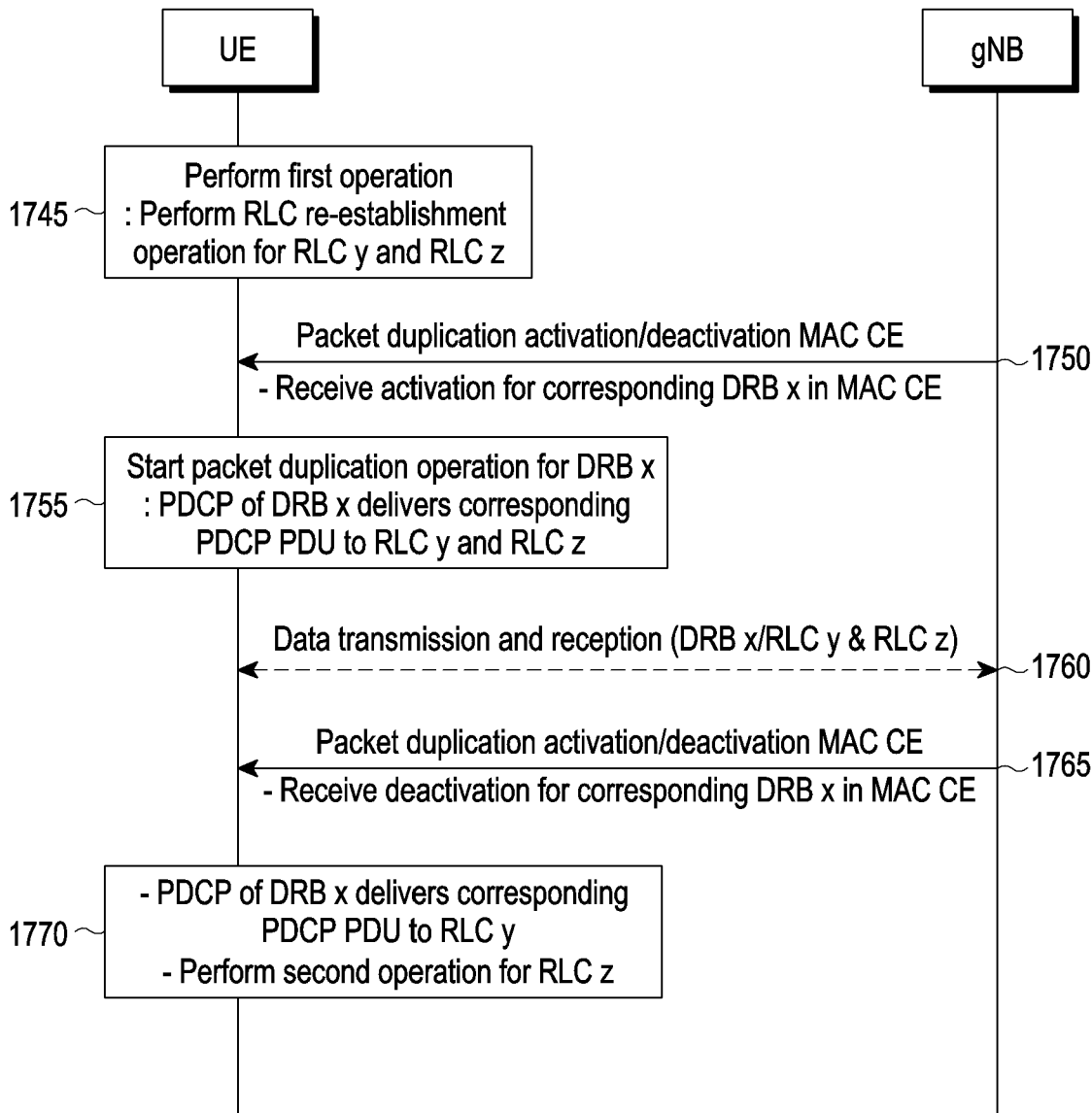

FIG. 17a and FIG. 17b are diagrams illustrating an overall operation in a case of reception of a packet duplication deactivation MAC CE according to an embodiment.

After camping on a serving cell (1705), a terminal may perform RRC connection establishment with a corresponding cell and transit into a connection mode (1710). In operation 1715, the terminal may receive configuration for DRBs through an RRC message of a base station. The base station may configure packet duplication for a DRB x as an example of the DRB configuration, designate an RLC y as a primary RLC, and designate an RLC z as a secondary RLC. That is, all of the RLC y and the RLC z are configured in the terminal, and this may mean a case that an original packet is delivered through the RLC y and a duplicated packet is delivered through the RLC z when a packet duplication activation MAC CE is received and packet duplication for a corresponding DRB is activated. In operation 1720, the terminal and the base station may perform data transmission and reception through an established DRB. In this operation, packet duplication is not activated yet, so a data packet or PDCP PDU may be delivered from PDCP of the DRX x to only the RLC y. In operation 1725, if a packet duplication activation/deactivation MAC CE is received and the MAC CE indicates packet duplication activation for the DRB x, the terminal may start a packet duplication operation for the DRB x in operation 1730. That is, the PDCP of the DRB x may deliver an original data packet (PDCP PDU) to the RLC y, and deliver a duplicated data packet (PDCP PDU) to the RLC z. In operation 1735, the terminal and the base station may perform transmission and reception of the original data packet and the duplicated data packet through the RLC y and the RLC z, that is, a packet duplication operation may be performed.

In operation 1740, the base station may transmit an RRC connection reconfiguration for synchronous configuration to the terminal to indicate an RLC re-establishment operation for the DRB x. In operation 1745, the terminal may perform a first operation (RLC re-establishment) as described below for the RLC y and the RLC z. This may mean that reconfiguration for the primary RLC(RLC y) and the secondary RLC(RLC z) may be included in the RRC message.

Discard all RLC SDU segments and RLC PDUs which are stored without being delivered to a transmission buffer and a retransmission buffer
  Stop or reset operations of all timers related to transmission
  T-PollRetransmit timer (herein, t-PollRetransmit which is a timer used in a transmitting end of an AM RLC entity is a timer for transmitting a pool. That is, the pool is not transmitted because no more RLC PDUs are transmitted through a corresponding RLC.)
  Reset all state values (state variables) and counter values related to transmission to initial values
  RLC AM
  : TX_Next_Ack, TX_Next, POLL_SN, PDU_WITHOUT_POLL, BYTE_WITHOUT_POLL, and RETX_COUNT
  RLC UM
  :TX_Next In operation 1750, the base station may transmit a MAC CE indicating activation of packet duplication to the terminal. That is, packet duplication activation for the corresponding DRB x may be indicated. In operation 1755, the terminal may perform a packet duplication operation. That is, the PDCP of the DRB x may deliver an original data packet (PDCP PDU) to the RLC y, and may deliver a duplicated data packet (PDCP PDU) to the RLC z. In operation 1760, the terminal and the base station may perform transmission and reception of the original data packet and the duplicated data packet through the RLC y and the RLC z, that is, a packet duplication operation may be performed. In operation 1765, the terminal may receive a MAC CE indicating deactivation of packet duplication from the base station. That is, upon receiving the packet duplication deactivation, the terminal may perform a second operation. As described in FIG. 16, the second operation represents an operation in a terminal RLC in a case of reception of a packet duplication deactivation MAC CE. In particular, it is characterized that the second operation is performed only in a secondary RLC entity (RLC z).

Discard all RLC PDUs which are stored without being delivered to a transmission buffer and process RLC SDU packets which are stored without being delivered to a retransmission buffer Option 1: Discard RLC SDU segments and all RLC PDUs from a retransmission buffer in a corresponding RLC entity Option 2: Discard all RLC data PDUs and RLC SDU segments except for an RLC control PDU from a retransmission buffer in a corresponding RLC entity Stop or reset operations of all timers related to transmission T-PollRetransmit timer (herein, t-PollRetransmit which is a timer used in a transmitting end of an AM RLC entity is a timer for transmitting a pool. That is, the pool is not transmitted because no more RLC PDUs are transmitted through a corresponding RLC.)

Reset all state values (state variables) and counter values related to transmission to initial values

RLC AM

: TX_Next_Ack, TX_Next, POLL_SN, PDU_WITHOUT_POLL, BYTE_WITHOUT_POLL, and RETX_COUNT

RLC UM

:TX_Next

Figure 18:
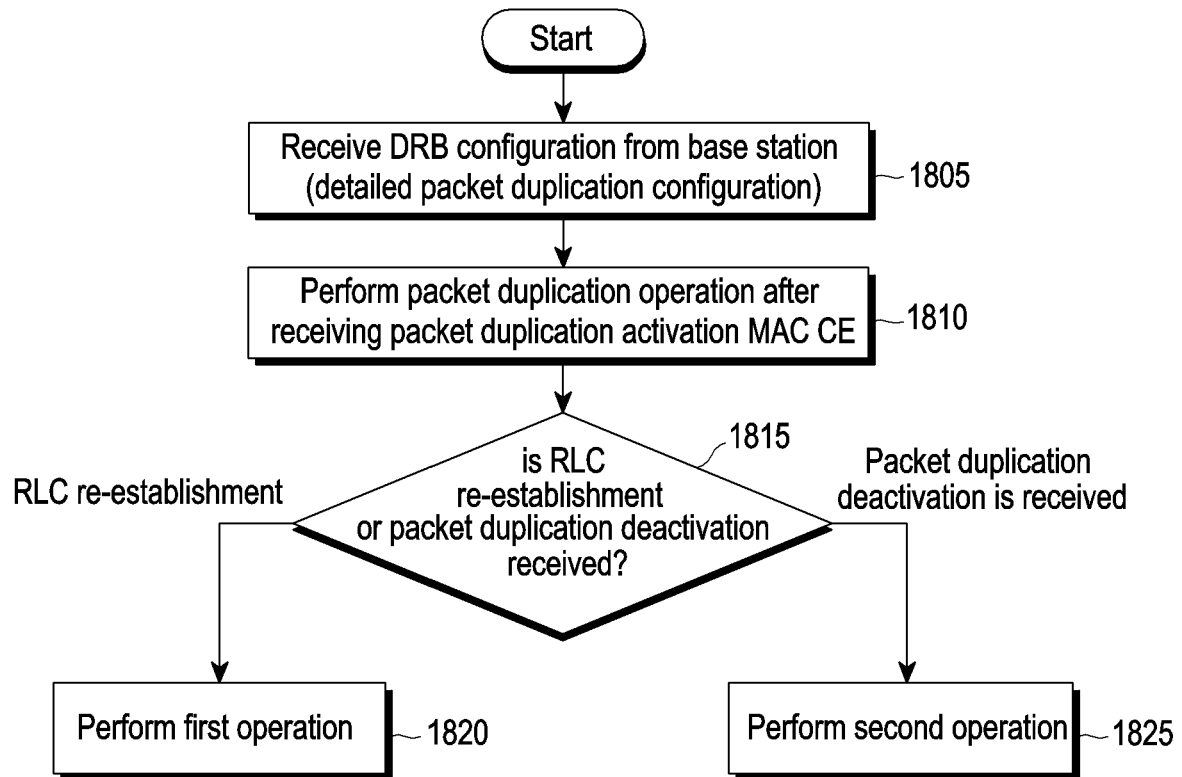
FIG. 18 is a diagram illustrating an operation of a terminal performing packet duplication according to an embodiment.

FIG. 18 is a diagram illustrating an operation of a terminal performing packet duplication according to an embodiment.

In operation 1805, a terminal in a connected state may receive a configuration for DRBs by receiving an RRC message from a base station. The base station may configure packet duplication for a DRB x as an example of the DRB configuration, designate an RLC y as a primary RLC, and designate an RLC z as a secondary RLC. That is, all of the RLC y and the RLC z are configured in the terminal, and this may mean that an original packet is delivered through the RLC y and a duplicated packet is delivered through the RLC z if a packet duplication activation MAC CE is received and packet duplication for a corresponding DRB is activated. In operation 1810, if a packet duplication activation/deactivation MAC CE is received and the MAC CE indicates packet duplication activation for the DRB x, the terminal may start a packet duplication operation for the DRB x. That is, a PDCP of the DRB x may deliver an original data packet (PDCP PDU) to the RLC y, and deliver a duplicated data packet (a PDCP PDU) to the RLC z. Thereafter, the terminal may perform transmission and reception of the original data packet and the duplicated data packet with the base station through the RLC y and the RLC z, that is, a packet duplication operation may be performed.

In operation 1815, an operation varies depending on which signal is received from the base station in the terminal. If the terminal receives an RLC re-establishment operation, the terminal may perform a first operation in operation 1820, and if the terminal receives a packet duplication deactivation MAC CE, the terminal may perform a second operation in operation 1825.

Figure 19:
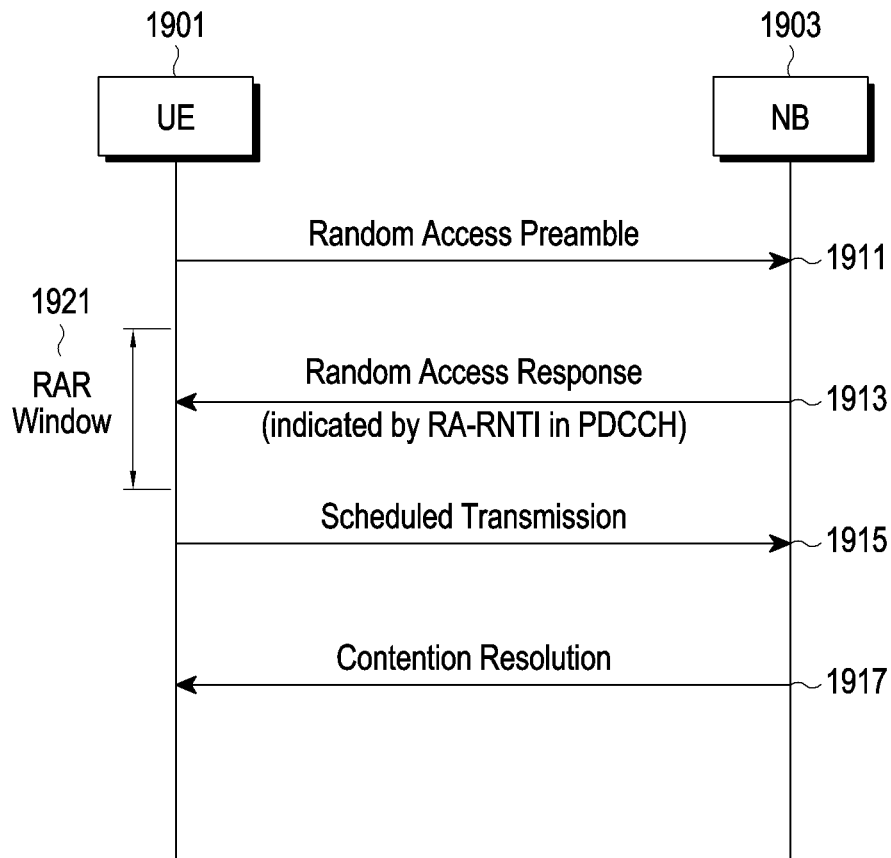
FIG. 19 is a message flow diagram between a terminal and a base station in a random access procedure in an LTE system and a 5G system according to an embodiment.

FIG. 19 is a message flow diagram between a terminal and a base station in a random access procedure in an LTE system and a 5G system according to an embodiment.

A terminal 1901 may perform a random access by performing the following procedure with the base station in a case of initial attachment, reattachment, handover, and various cases where a random access is required.

First, the terminal 1901 may transmit a random access preamble via a physical channel for a random access for attachment to a base station 1903 (1911). In an LTE system, the physical channel is referred to as a physical random access channel (PRACH), and a case that one or more terminals simultaneously transmit a random access preamble on a corresponding PRACH resource may occur. The random access preamble is a specific sequence which is specially designed such that the random access preamble may be received even though the random access preamble is transmitted before being completely synchronized with a base station, and there may be a plurality of preamble identifiers (indices) according to a standard. If there is a plurality of preamble identifiers, a preamble transmitted by the terminal may be a preamble which the terminal randomly selects or a specific preamble which the base station designates. In an LTE system and an NR system, 64 preamble identifiers may exist. The base station may divide the 64 preamble identifiers into a group A and a group B. For example, if a message size in operation 1915 to be described later is larger than a predetermined value (messageSizeGroupA) set by the base station, and signal strength from the base station is sufficiently strong, the terminal may transmit a preamble using a preamble index corresponding to the group B, otherwise, the terminal may transmit a preamble using a preamble index corresponding to the group A. Accordingly, upon receiving the preamble index corresponding to the group B, the base station may allocate a larger resource to the corresponding terminal in operation 1915. Meanwhile, the base station may set the preamble index group for each beam described above. Accordingly, the following parameters may be set so that the group A and the group B may be divided for each beam (or for Synchronization Signal Block (SSB) corresponding to each beam).

sizeOfRA-PreamblesGroupA numberOfRA-Preambles startIndex-PreambleGroupA

Alternatively, a list of (one or more) SSB identifiers in addition to the parameter set may inform the base station that the terminal performs a random access in which SSB (i.e., in which beam).

list of SSBs (multiple of SSB ids)

If the list of SSBs (multiple of SSB ids) does not exist, and only one parameter set exists, the terminal may indicate that the parameter set corresponds to all SSBs. Further, only a first SSB identifier among SSB identifiers of each parameter set may be signaled to reduce overhead. For example, if there are total 16 SSBs, and the one parameter set is allocated to each of SSBs 1 to 4, SSBs 5 to 8, SSBs 9 to 12, and SSBs 13 to 16, the list of SSBs fields includes only an SSB 1, an SSB 5, an SSB 9, and an SSB 13, respectively, so it may be implicitly informed that a parameter set which a receiving terminal informs by an SSB 1 is indicated as 1-4.

Accordingly, a random access preamble group A for a specific SSB may be defined from startIndex-PreambleGroupA to startIndex-PreambleGroupA+sizeOfRA-PreamblesGroupA-1, and a group B may be defined from startIndex-PreambleGroupA+sizeOfRA-PreamblesGroupA to startIndex-PreambleGroupA+numberOfRA-Preambles-1.

Table 1 summarizes the parameters transmitted by the base station.

TABLE 1

| Per-SSBs parameters | > preambleInfo<br>>> numberOfRA-Preambles<br>>> sizeOfRA-PreamblesGroupA<br>>> startIndex-PreambleGroupA<br>> list of SSBs (multiple of SSB ids) |
|---|---|
| Per-Cell parameters | > prach-ConfigIndex<br>> messageSizeGroupA<br>> powerRampingParameters<br>> ra-SupervisionInfo |

Upon receiving the preamble, the base station may transmit a Random Access Response (RAR) message in response to this to the terminal (1913). The RAR message may include identifier information of the preamble used in operation 1901, uplink transmission timing correction information, uplink resource allocation information to be used in a subsequent operation (i.e., operation 1915), temporary terminal identifier information, and/or the like. The identifier information of the preamble may be transmitted to inform that the RAR message is a response message to which preamble if, for example, a plurality of terminals transmit different preambles to attempt random accesses in operation 1911. The uplink resource allocation information is detailed information about a resource to be used by the terminal in operation 1915, and may include a physical location and a size of the resource, a decoding and coding method (modulation and coding scheme) used in transmission, power adjustment information in transmission, etc. If a terminal transmitting a preamble performs an initial attachment, the terminal does not have an identifier allocated by the base station for a communication with the base station, so the temporary terminal identifier information is a value transmitted for this.

The RAR message needs to be transmitted within a predetermined duration from predetermined time after transmitting the preamble, and the duration may be referred to as an RAR window. In addition, when the RAR message is transmitted, the base station schedules the corresponding RAR message through a PDCCH, corresponding scheduling information is scrambled using a random access-radio network temporary identifier (RA-RNTI), the RA-RNTI is mapped to a PRACH resource used to transmit the message in operation 1911, and the terminal which transmits a preamble in a specific PRACH resource may attempt reception of a PDCCH based on a corresponding RA-RNTI to identify whether there is a corresponding RAR message.

Upon receiving the RAR message, the terminal may transmit another message in the resource to which the RAR message is allocated according to various purposes described above (1915). A third message which is transmitted in FIG. 19 may also be referred to as Msg3 (that is, the preamble in operation 1911 is also called Msg1, and the RAR in operation 1913 is also called Msg2). The terminal may transmit an RRCConnectionRequest message which is a message of an RRC layer as an example of the Msg3 in a case of initial attachment, transmit an RRCConnectionReestablishmentRequest message as an example of the Msg3 in a case of reattachment, and transmit an RRCConnectionReconfigurationComplete message in a case of handover. Alternatively, a buffer status report (BSR) message for resource request, etc., may be transmitted.

Thereafter, the terminal receives a contention resolution message from the base station for an initial transmission case (i.e., a case that base station identifier information which is already allocated to the terminal is not included in an Msg3, etc.) (1917), the contention resolution message includes content which the terminal transmits in the Msg3 as it is, so the contention resolution message may inform that it is a response to which terminal even though there are a plurality of terminals selecting the same preamble in operation 1911.

Meanwhile, using the random access procedure, the terminal may perform a procedure for requesting a system information block (SIB) broadcasted by the base station. This is called an on-demand system information request procedure. The system information block is a message including parameters which terminals within a cell may commonly use. For example, a very important system information block is periodically broadcasted, but in a case that importance of system information is low or the system information is valid only for some terminals, a scenario in which the system information is not periodically broadcasted, and is only transmitted to a corresponding terminal or broadcasted to all terminals within a cell when requested by the corresponding terminal is possible. The very important system information block may be transmitted in a message named Master Information Block, Remaining System Information (RMSI, or SIB1), and other system information may be transmitted in a message named Other System Information (or Other SIB).

For the above procedure, an NR base station may allocate some of 64 preamble indices described above for a use of the Other SIB request. Accordingly, some of the 64 preamble indices are included in the RMSI and transmitted. If the terminal needs to request a SIB which corresponds to Other SIB, the terminal may transmit a corresponding preamble according to the information included in the RMSI (1911). If the base station successfully receives the preamble, the base station may transmit an RAR message including only the transmitted random access preamble index information to the terminal (1913). Accordingly, the terminal may know that the transmitted preamble has been normally received by the base station, and then receive the requested system information transmitted by the base station. That is, if the system information is requested based on the preamble, the above-described operations 1915 and 1917 are not required.

If the preamble is transmitted to request the SI as described above, the base station may perform transmission in only a beam where the terminal requesting the SI exists, or may perform transmission such that all terminals within the cell may perform transmission. For example, if the requested system information is used only by the terminal requesting the system information, the base station does not need to broadcast corresponding content in all beams, so the base station may allocate a preamble identifier for requesting the SI per beam. If the requested system information is information which may be useful for many terminals within the cell, the base station does not need to allocate the corresponding information per beam (or per SSB), and may commonly allocate the corresponding information to the cell.

If it is allocated per SSB, this may be indicated by additionally defining a sizeOfRA-PreambleSIrequest parameter in a parameter set allocated per SSB described above. According to this, a random access preamble group A of a specific SSB may be defined from startIndex-PreambleGroupA to startIndex-PreambleGroupA+sizeOfRA-PreamblesGroupA-1, a group B may be defined from startIndex-PreambleGroupA+sizeOfRA-PreamblesGroupA to startIndex-PreambleGroupA+numberOfRA-Preambles-1, and a preamble index for SI request in a corresponding SSB may be defined as a preamble index within a range of startIndex-PreambleGroupA+numberOfRA-Preambles to startIndex-PreambleGroupA+numberOfRA-Preambles+sizeOfRA-PreambleSIrequest-1. Accordingly, preambles may be allocated to each SSB in order of the preamble group A, the preamble group B, and a preamble group for SI request.

If it is commonly allocated to the cell, a method of additionally introducing sizeOfRA-PreambleSIrequest and startIndex-SIrequest to a parameter commonly used for the cell. In this case, a preamble group used for SI request may be defined as preambles having indices of startIndex-SIrequest index to startIndex-SIrequest+sizeOfRA-PreambleSIrequest-1. Using the above method, the terminal requests system information according to the set information when requesting the system information thereby the base station may broadcast the system information in a corresponding beam or to the entire cell.

Figure 20:
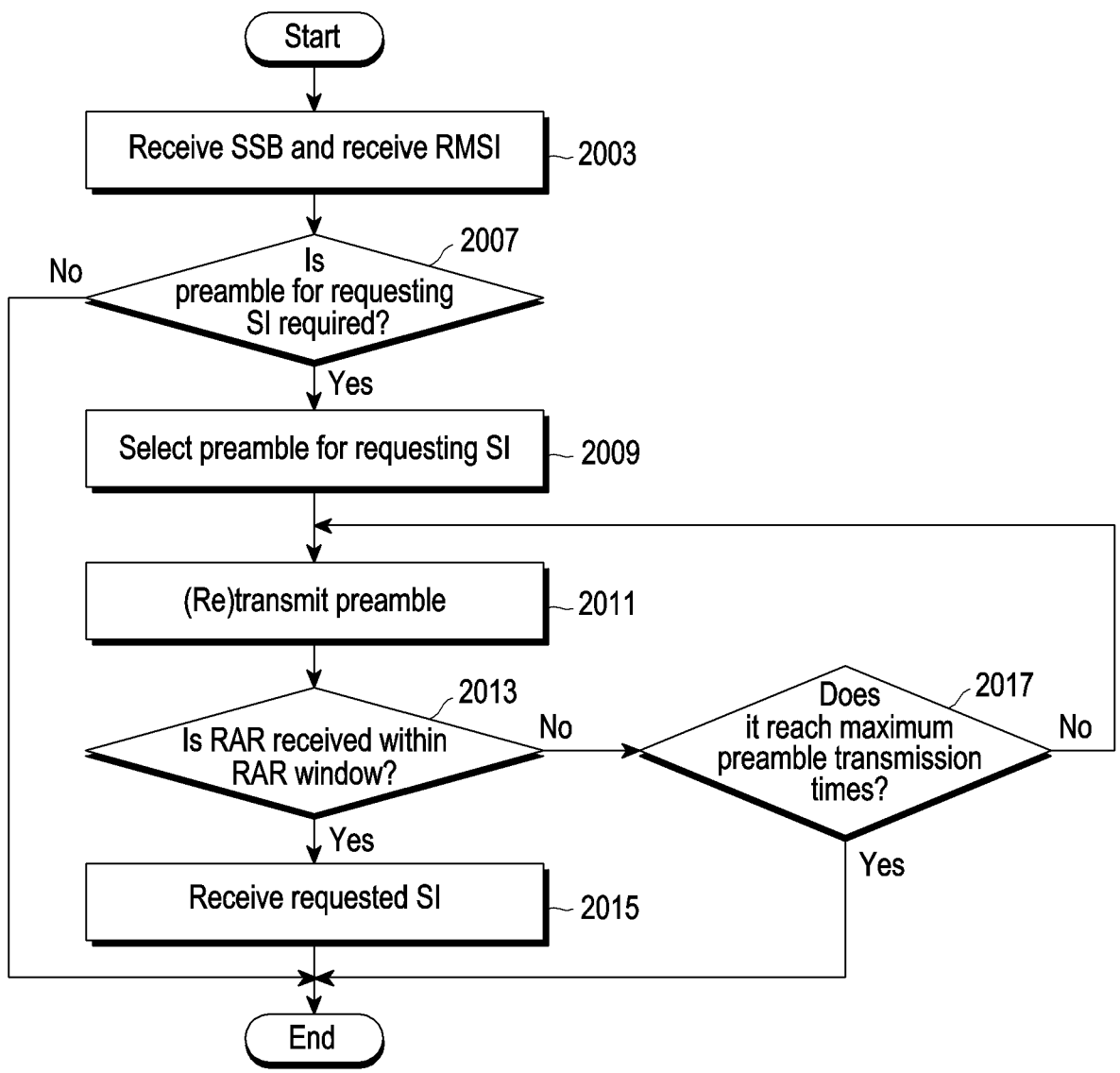
FIG. 20 is an example flowchart illustrating an operation of a terminal in a random access procedure in an LTE system and a 5G system according to an embodiment.

FIG. 20 is an example flowchart illustrating an operation of a terminal in a random access procedure in an LTE system and a 5G system according to an embodiment.

In FIG. 20, it will be assumed that the terminal is in an IDLE state in which the terminal has not yet been connected to a base station, so the terminal selects a cell based on signal strength and whether the terminal subscribes to a mobile operator, and stays in the corresponding cell. This is called camping.

Thereafter, the terminal camped on the corresponding cell may transit into CONNECTED by transmitting an attachment request message to the base station, or may request system information from the base station in the IDLE state if necessary.

To this end, the terminal may first receive an SS block (SSB) from the base station (2003). The SSB collectively refers to synchronization signals for synchronization and the MIB (or master system information (MSI)). If the base station transmits a signal based on a beam, each beam (or each beam group) may transmit the SSB. If the base station transmits an SSB for each beam, the terminal may select an SSB having the strongest received strength among SSBs of which received strength is greater than or equal to a predetermined threshold value (ssb-Threshold). The MSI includes information capable of receiving RMSI, so corresponding RMSI information may be also be received. The RMSI includes information such as systemInfoValueTag or systemInfoConfigurationIndex (hereinafter referred to as valuetag) for each SI, so version information may be transmitted for each SI transmitted by the base station. For example, if there are five OSIs (OSI 1, OSI 2, OSI 3, OSI 4, and OSI 5), a valuetag may be transmitted for each OSI. For example, assuming a case where valuetags of 3, 2, 5, 4, 6, etc., are transmitted for each OSI, if the terminal receives all OSIs which correspond to each valuetag, the terminal may identify whether the terminal has the latest version by checking only the valuetag number. In the above example, if the terminal receives the value tags 3, 2, "6", 4, and 6 for each OSI, the terminal may detect that there is an update on OSI #3 and request OSI #3 from the base station. Further, the RMSI may include the random access-related parameter for each SSB and the random access information commonly used for the cell described above.

Thereafter, the terminal may identify whether transmission of a preamble for SI request is required (2007). As in the above example, the terminal may identify that the request is required if a valuetag value which the base station transmits through RMSI is different from a valuetag value of SI which the terminal stores, or the terminal may identify that the request is required if the base station does not periodically broadcast the corresponding SI or if the terminal requires the request even though the base station periodically broadcast the corresponding SI.

If it is identified that the transmission of the preamble is required, the terminal may identify which preamble needs to be transmitted for requesting the corresponding SI and selects this (2009). As described above, according to an SI type, the base station may allocate a preamble group for the corresponding SI to each SSB or may commonly allocate the preamble group for the corresponding SI to the cell.

Accordingly, if it is allocated to each SSB for requesting the corresponding SI, a preamble index mapped to the corresponding SI may be selected from among preamble indices within an SI request preamble group for a corresponding SSB, i.e., a range of startIndex-PreambleGroupA+numberOfRA-Preambles to startIndex-PreambleGroupA+numberOfRA-Preambles+sizeOfRA-PreambleSIrequest-1.

If a preamble index is commonly allocated to the cell for requesting the corresponding SI, a preamble index mapped to the corresponding SI may be selected within a preamble having an index of startIndex-SIrequest to an index of startIndex-SIrequest+sizeOfRA-PreambleSIrequest -1 which are indicated by the base station among preamble indices.

Thereafter, the terminal transmits the selected preamble (2011) and waits for a response to this (2013). The terminal waits for the response during ra-ResponseWindow time set by the base station after X OFDM symbols after transmission of the preamble. As described above, if the terminal receives an RAR including only transmitted random access preamble index information (RAPID), the terminal may identify that a random access procedure for requesting the SI has been successfully completed, terminate the random access procedure, and receive the requested SI from the base station (2015). If the random access procedure for requesting the SI fails, the terminal may attempt to transmit the preamble up to a maximum number of preamble transmission times to perform system information request (2017).

Methods according to embodiments described in the claims or specification of the present disclosure may be implemented in a form of hardware, software, or a combination of the hardware and the software.

In a case of being implemented in the software, a computer readable storage medium storing one or more programs (a software module) may be provided. The one or more programs stored in the computer readable storage medium may be configured to be executable by one or more processors in an electronic device. The one or more programs may include instructions that cause the electronic device to execute methods according to embodiments described in the claims or a specification of the present disclosure.

These programs (a software module and a software) may be stored in a random access memory, a non-volatile memory including a flash memory, a read only memory (ROM), an electrically erasable programmable read only memory (EEPROM), a magnetic disc storage device, a compact disc-ROM (CD-ROM), digital versatile discs (DVDs) or an optical storage device of a different type, and a magnetic cassette. Alternatively, these programs may be stored in a memory composed of a combination of some or all of them. Also, a plurality of component memories may be included.

The program may be stored in an attachable storage device which may be accessed through a communication network composed of a communication network such as an internet, an intranet, a local area network (LAN), a wide LAN (WLAN), or a storage area network (SAN), or a combination thereof. This storage device may access a device performing an embodiment of the present disclosure though an external port. In addition, a separate storage device on a communication network may access the device performing an embodiment of the present disclosure.

In specific embodiments of the present disclosure, a component included in the present disclosure is expressed in a singular form or a plural form according to a proposed specific embodiment. However, the singular form or the plural form is suitable because the form was selected according to a situation proposed for convenience, so the present disclosure is not limited to a single component or a plurality of components, and the components which have been expressed in the plural form may be expressed in the singular form or a component which has been expressed in the singular form may be expressed in the plural form.

Although specific embodiments of the disclosure have been described above, various changes may be made thereto without departing from the scope of the disclosure. Thus, the scope of the disclosure should not be limited to the above-described embodiments, and should rather be defined by the following claims and equivalents thereof.

What is claimed is:

1. A method for random access by a user equipment (UE), the method comprising:
   receiving, from a base station, a system information block 1 (SIB1), the SIB1 including a value tag for a system information (SI) and information on a random access preamble start index for SI request, and the SI not being broadcasted; and
   performing a random access procedure for requesting the SI based on the value tag for the SI and the information on the random access preamble start index for the SI request,
   wherein the performing comprises:
      selecting a random access preamble for requesting the SI from at least one random access preamble determined based on the information on the random access preamble start index for the SI request;
      transmitting, to the base station, the random access preamble for requesting the SI;
      receiving, from the base station, a random access response including a random access preamble ID (RAPID) which identifies the transmitted random access preamble for requesting the SI; and
      identifying that the random access procedure for requesting the SI is successfully completed based on the random access response.

2. The method of claim 1, further comprising:
   performing a four step random access procedure based on at least one of a preamble group A and a preamble group B,
   wherein the performing the four step random access procedure comprises:
      identifying whether a size of a message 3 (Msg3) is greater than a threshold;
      selecting a random access preamble for the preamble group B in case that the size of the Msg3 is greater than the threshold; and
      selecting a random access preamble for the preamble group A in case that the size of the Msg3 is not greater than the threshold.

3. The method of claim 1, the performing comprising:
   determining whether a stored SI is valid or not based on the value tag for the SI; and
   determining to perform the random access procedure for requesting the SI in response to the stored SI being not valid based on the value tag for the SI.

4. The method of claim 2,
   wherein an index of the random access preamble for requesting the SI is different from an index of the random access preamble for the preamble group A and an index of the random access preamble for the preamble group B.

5. A method for random access by a base station, the method comprising:
   transmitting, to a user equipment (UE), a system information block 1 (SIB1), the SIB1 including a value tag for system information (SI) and information on a random access preamble start index for SI request, and the SI not being broadcasted; and
   performing a random access procedure for requesting the SI based on the value tag for the SI and the information on the random access preamble start index for the SI request,
   wherein the performing comprises:
      receiving, from the UE, a random access preamble for requesting the SI, the random access preamble for requesting the SI is selected from at least one random access preamble determined based on the random access preamble start index for the SI request; and
      transmitting, to the UE, a random access response including a random access preamble ID (RAPID) which identifies the received random access preamble for requesting the SI.

6. The method of claim 5, further comprising:
   performing a four step random access procedure based on at least one of a preamble group A and a preamble group B,
   wherein the performing the four step random access procedure comprises:
      receiving, from the UE, a random access preamble for the preamble group B in case that a size of a message 3 (Msg3) is greater than a threshold; and
      receiving, from the UE, a random access preamble for the preamble group A in case that the size of the Msg3 is not greater than the threshold.

7. The method of claim 6, wherein an index of the random access preamble for requesting the SI is different from an index of the random access preamble for the preamble group A and an index of the random access preamble for the preamble group B.

8. A user equipment (UE) for random access, the UE comprising:
   a transceiver; and
   a controller coupled with the transceiver and configured to control to:
      receive, from a base station, a system information block 1 (SIB1), the SIB1 including a value tag for system information (SI) and information on a random access preamble start index for SI request, and the SI not being broadcasted, and perform a random access procedure for requesting the SI based on the value tag for the SI and the information on the random access preamble start index for the SI request, wherein to perform the random access procedure, the controller is further configured to:

select a random access preamble for requesting the SI from at least one random access preamble determined based on the information on the random access preamble start index for the SI request;

transmit, to the base station, the random access preamble for requesting the SI;

receive, from the base station, a random access response including a random access preamble ID (RAPID) which identifies the transmitted random access preamble for requesting the SI; and identify that the random access procedure for requesting the SI is successfullly completed based on the random access response.

9. The UE of claim 8, wherein the controller is configured to:

perform a four step random access procedure based on at least one of a preamble group A and a preamble group B, wherein to perform the four step random access procedure, the controller is further configured to:

identify whether a size of a message 3 (Msg3) is greater than a threshold;

select a random access preamble for the preamble group B in case that the size of the Mg3 is greater than the threshold; and select a random access preamble for the preamble group A in case that the size of the Mg3 is not greater than the threshold.

10. The UE of claim 8, wherein the controller is configured to:

determine whether a stored SI is valid or not based on the value tag for the SI, and determine to perform the random access procedure for requesting the SI in response to the stored SI being not valid based on the value tag for the SI.

11. The UE of claim 9, wherein an index of the random access preamble for requesting the SI is different from an index of the random access preamble for the preamble group A and an index of the random access preamble for the preamble group B.

12. A base station for random access, the base station comprising:

a transceiver; and a controller coupled with the transceiver and configured to control to:

transmit, to a user equipment (UE), a system information block 1 (SIB1), the SIB1 including a value tag for system information (SI) and information on a random access preamble start index for SI request, and the SI not being broadcasted, and perform a random access procedure for requesting the SI based on the value tag for the SI and the information on the random access preamble start index for the SI request, wherein to perform the random access procedure, the controller is further configured to:

receive, from the UE, a random access preamble for requesting the SI, the random access preamble for requesting the SI is selected from at least one random access preamble determined based on the random access preamble start index for the SI request, and transmit, to the UE, a random access response including a random access preamble ID (RAPID) which identifies the received random access preamble for requesting the SI.

13. The base station of claim 12, wherein the controller is configured to:

perform a four step random access procedure based on at least one of a preamble group A and a preamble group B, wherein to perform the four step random access procedure, the controller is further configured to:

receive, from the UE, a random access preamble for the preamble group B in case that a size of a message 3 (Msg3) is greater than a threshold; and receive, from the UE, a random access preamble for the preamble group A in case that the size of the Msg3 is not greater than the threshold.

14. The base station of claim 13, wherein an index of the random access preamble for requesting the SI is different from an index of the random access preamble for the preamble group A and an index of the random access preamble for the preamble group B.

* * * * *

UNITED STATES PATENT AND TRADEMARK OFFICE
CERTIFICATE OF CORRECTION

PATENT NO. : 12,213,123 B2
APPLICATION NO. : 17/809207
DATED : January 28, 2025
INVENTOR(S) : Jaehyuk Jang et al.

Page 1 of 1

It is certified that error appears in the above-identified patent and that said Letters Patent is hereby corrected as shown below:

On the Title Page

Item [30], insert to read:
--Foreign Application Priority Data
Jan. 10, 2018 (KR)..................10-2018-0003594--

Signed and Sealed this
Twenty-ninth Day of April, 2025

Coke Morgan Stewart
*Acting Director of the United States Patent and Trademark Office*